US012640678B2

(12) United States Patent
Huzyak et al.

(10) Patent No.: US 12,640,678 B2
(45) Date of Patent: May 26, 2026

(54) TERRAIN-FOLLOWING SOLAR TRACKER SYSTEM

(71) Applicant: FLEXRACK by Qcells LLC, Highland Hills, OH (US)

(72) Inventors: Gregory P. Huzyak, Salem, OH (US); Nathan Allen Knapp, Warren, OH (US)

(73) Assignee: FLEXRACK by Qcells LLC, Highland Hills, OH (US)

( * ) Notice: Subject to any disclaimer, the term of this patent is extended or adjusted under 35 U.S.C. 154(b) by 0 days.

(21) Appl. No.: 19/229,830

(22) Filed: Jun. 5, 2025

(65) Prior Publication Data

US 2025/0379542 A1      Dec. 11, 2025

Related U.S. Application Data

(60) Provisional application No. 63/656,485, filed on Jun. 5, 2024.

(51) Int. Cl.
　　*H02S 20/32*　　　(2014.01)
　　*H02S 20/10*　　　(2014.01)
(52) U.S. Cl.
　　CPC .............. *H02S 20/32* (2014.12); *H02S 20/10* (2014.12)

(58) Field of Classification Search
　　CPC ................................. H02S 20/32; H02S 20/10
　　See application file for complete search history.

(56) References Cited

U.S. PATENT DOCUMENTS

| | | | |
|---|---|---|---|
| 2021/0194416 A1 | 6/2021 | Praca et al. | |
| 2023/0129712 A1 | 4/2023 | Delgado-Nanez et al. | |
| 2023/0208349 A1* | 6/2023 | Taha ....................... | H02S 10/00 136/246 |

FOREIGN PATENT DOCUMENTS

| | | | | |
|---|---|---|---|---|
| EP | 4311986 A1 * | 1/2024 | ............ | F24S 30/425 |
| WO | 2025010815 A1 | 1/2025 | | |

* cited by examiner

*Primary Examiner* — Angelo Trivisonno
(74) *Attorney, Agent, or Firm* — Sheppard Mullin Richter & Hampton LLP

(57) ABSTRACT

A drive system includes a ring gear configured to rotate about a first axis; a first articulating joint including a driving yoke, a driven yoke and a spider coupling the driving yoke to the driven yoke, the driving yoke coupled to the drive gear and configured to rotate about the first axis, the driven yoke configured to rotate about a second axis; a first output shaft coupled to the driven yoke and configured to be coupled to a first solar canopy, the first output shaft configured to induce tilt in the first solar canopy; and a pivotable post bracket system coupled to the ring gear, the pivotable post bracket system configured to be coupled to a post and configured to pivot relative to the post.

19 Claims, 23 Drawing Sheets

Terrain-following tracker system 100

Drive system 108

Drive system 108

Terrain-following tracker system 100

Terrain-following tracker system 100

Terrain-following clamping sytem 600

Terrain-following clamping system 600

Terrain-following clamping system 600

FIG. 6D

Terrain-following clamping system 600

Terrain-following tracker system 100

Terrain-following tracker system 100

TERRAIN-FOLLOWING SOLAR TRACKER SYSTEM

PRIORITY CLAIM

This application claims benefit of and hereby incorporates by reference U.S. provisional application Ser. No. 63/656,485, entitled "TERRAIN-FOLLOWING SLEW DRIVE SYSTEM," filed on Jun. 5, 2024, by inventors Gregory P. Huzyak et al.

TECHNICAL FIELD

This invention relates generally to systems and methods for a tracker system suited for uneven terrains.

BACKGROUND

A tracker system is configured to orient solar panels with movement of the sun. Often, natural terrain on which a tracker system is installed may be uneven, which causes difficulties in connecting several solar canopies in a chain. Efforts to address these limitations using extensive grading or by using posts with precisely controlled lengths has proven unruly and burdensome. Therefore, a tracker system that is adaptable to uneven terrain would be helpful.

SUMMARY

A terrain-following tracker system includes solar canopies connected to each other by a terrain-following drive system and/or by a terrain-following clamping system.

The terrain-following drive system causes tilting of the first solar canopy about a first axis and tilting of the second solar canopy about a second axis. The drive system includes a drive, an articulating joint, a first output shaft, and a second output shaft. The drive includes a slewing drive that may include a ring gear rotatable by a worm screw. The worm screw may be rotated by a drive motor. Along a first side relative to the drive, the drive is coupled to the articulating joint, which is coupled to the first output shaft. The first output shaft is coupled to the first solar canopy. Along a second, opposite side relative to the drive, the drive is further coupled to a second output shaft. On the first side, rotation of the ring gear causes rotation of the articulating joint, which in turn causes rotation of the first output shaft and tilting of the first solar canopy about the first axis. Along the second side, rotation of the ring gear causes rotation of the second output shaft, which in turn causes tilting of the second solar canopy about the second axis.

In some embodiments, the articulating joint may enable angular adjustment between the first axis and the second axis by several degrees, e.g., up to 25 degrees (whether vertically or laterally or both). In some embodiments, an articulating joint may be disposed on each side of the drive to double the amount of adjustment available between the first axis and the second axis.

In some embodiments, the first solar canopy includes a first torque tube, first solar panels and a first support structure attaching the first solar panels to the first torque tube. In some embodiments, the second solar canopy includes a second torque tube, second solar panels and a second support structure attaching the second solar panels to the second torque tube.

The terrain-following tracker system may be secured to a terrain surface via a drive post (e.g., posts with an adjacent, proximate, or attached drive system) and clamping or idle posts (e.g., posts without an adjacent, proximate, or attached drive system). Because of the articulating joint, each drive post or clamping post may not have strict height requirements. Thus, instead of having to grade the terrain to be substantially planar, the articulating joint assists the tracker system to be terrain following.

To impart additional terrain following functionality, the drive system may be attached to the drive post in a manner that permits tilting of the drive system relative to the drive post. In some embodiments, the terrain-following tracker system may include a pivotable post bracket system.

As indicated above, the terrain-following tracker system may also include terrain-following clamping systems. Terrain-following clamping systems may securely attach adjacent solar canopies to each other or attach a solar canopy to a clamping post. For example, terrain-following clamping systems may securely attach the first solar canopy to a third solar canopy along the first side of the drive. Terrain-following clamping systems may include articulating clamping systems or non-articulating clamping systems.

An articulating clamping system has an adjacent or proximate articulating joint, while a non-articulating clamping system is lacking an adjacent or proximate articulating joint. For example, an articulating clamping assembly positioned between the first and third solar canopies may cause the third solar canopy to tilt at a third angle which may be different from the first angle or the second angle. As another example, a non-articulating clamping assembly positioned between the first and third solar canopies may cause the third solar canopy to tilt at approximately the first angle, to match the tilt of the adjacent solar panel.

In some embodiments, a drive system comprises a ring gear configured to rotate about a first axis; a first articulating joint including a driving yoke, a driven yoke and a spider coupling the driving yoke to the driven yoke, the driving yoke coupled to the drive gear and configured to rotate about the first axis, the driven yoke configured to rotate about a second axis; a first output shaft coupled to the driven yoke and configured to be coupled to a first solar canopy, the first output shaft configured to induce tilt in the first solar canopy; and a pivotable post bracket system coupled to the ring gear, the pivotable post bracket system configured to be coupled to a post and configured to pivot relative to the post.

The pivotable post bracket system may comprise a pivoting post bracket and a drive bracket. The pivoting bracket may comprise fastener slots, each of the fastener slots configured to hold a fastener to affix the pivoting post bracket to a post and enable pivoting of the pivoting post bracket relative to the post. The fastener slots may comprise arcuate slots. The fastener slots may be symmetrically distributed. The first output shaft may include an articulating joint bracket, an offset link, and a torque tube interface. The first articulating joint may be coupled to a first side of the ring gear, and the drive system may further comprise a second output shaft coupled to a second side of the ring gear and configured to be coupled to a second solar canopy. The drive system may comprise a second articulating joint coupled between the second side of the ring gear and the second output shaft. The ring gear may include first mating fasteners, and the drive system may further comprise second mating fasteners coupling the first articulating joint to the first mating fasteners. The drive system may comprise first mating fasteners and second mating fasteners coupling the first articulating joint to the first output shaft.

In some embodiments, a terrain-following tracker system comprises a first post; a second post; a first solar canopy between the first post and the second post; a drive system coupled between the first post and the first solar canopy, the drive system comprising: a ring gear configured to rotate about a first axis; a first articulating joint including a driving yoke, a driven yoke and a spider coupling the driving yoke to the driven yoke, the driving yoke coupled to the drive gear and configured to rotate about the first axis, the driven yoke configured to rotate about a second axis; a first output shaft coupled to the driven yoke and to the first solar canopy, the first output shaft configured to induce tilt in the first solar canopy; and a pivotable post bracket system coupled to the ring gear, the pivotable post bracket system coupled to the first post and configured to pivot relative to the first post; and a clamping system coupled between the second post and the first solar canopy and configured to tilt in response to the tilt of the first solar canopy.

The clamping system may include a non-articulating clamping system. The clamping system may include an articulating clamping system. The articulating clamping system may include a second articulating joint. The second articulating joint may be positioned between the second post and the first solar canopy. The pivoting post bracket may comprise fastener slots, each of the fastener slots configured to hold a fastener to affix the pivoting post bracket to the first post and enable pivoting of the pivoting post bracket relative to the first post. The fastener slots may comprise arcuate slots. The first articulating joint may be coupled to a first side of the ring gear, and the terrain-following tracker system may further comprise a second output shaft coupled to a second side of the ring gear and configured to be coupled to a second solar canopy. The ring gear may include first mating fasteners, and the terrain-following tracker system may further comprise second mating fasteners coupling the first articulating joint to the first mating fasteners. The terrain-following tracker system may comprise first mating fasteners and second mating fasteners coupling the first articulating joint to the first output shaft.

4

Figure 6A:
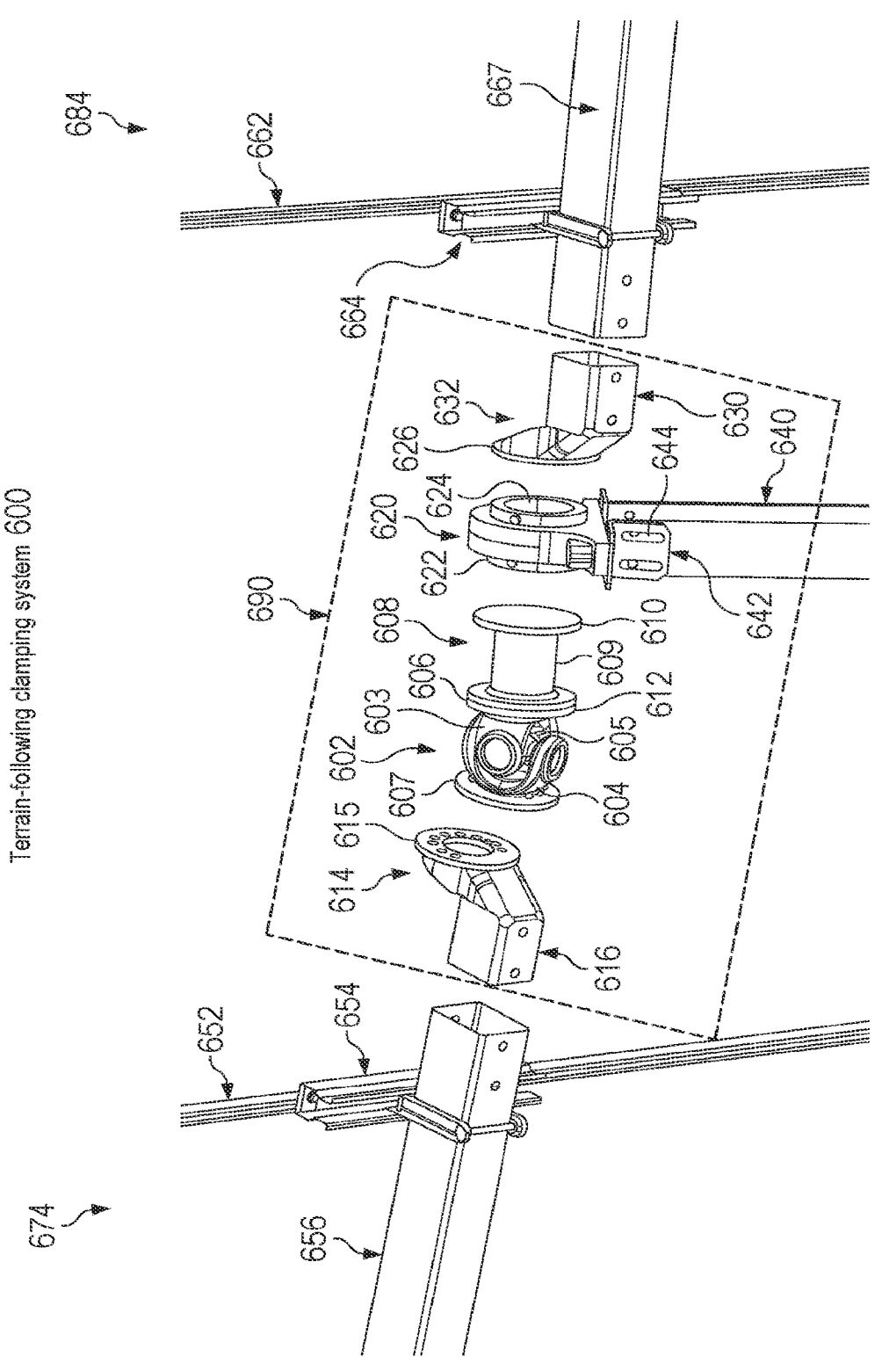

FIG. 6A illustrates an exploded front view of an example terrain-following clamping system according to some embodiments of the present invention.

Figure 6B:
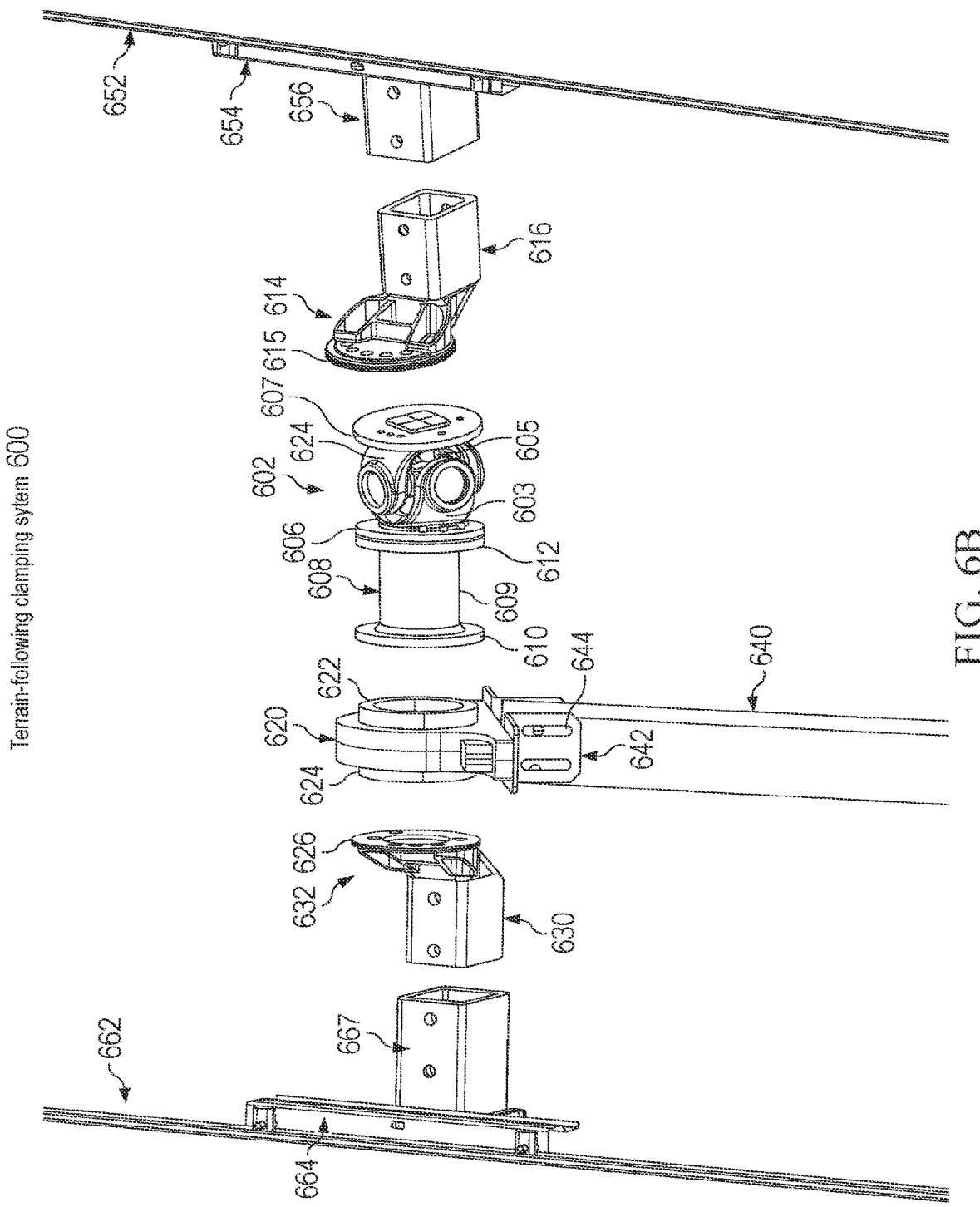

FIG. 6B illustrates an exploded back view of an example terrain-following clamping system according to some embodiments of the present invention.

Figure 6C:
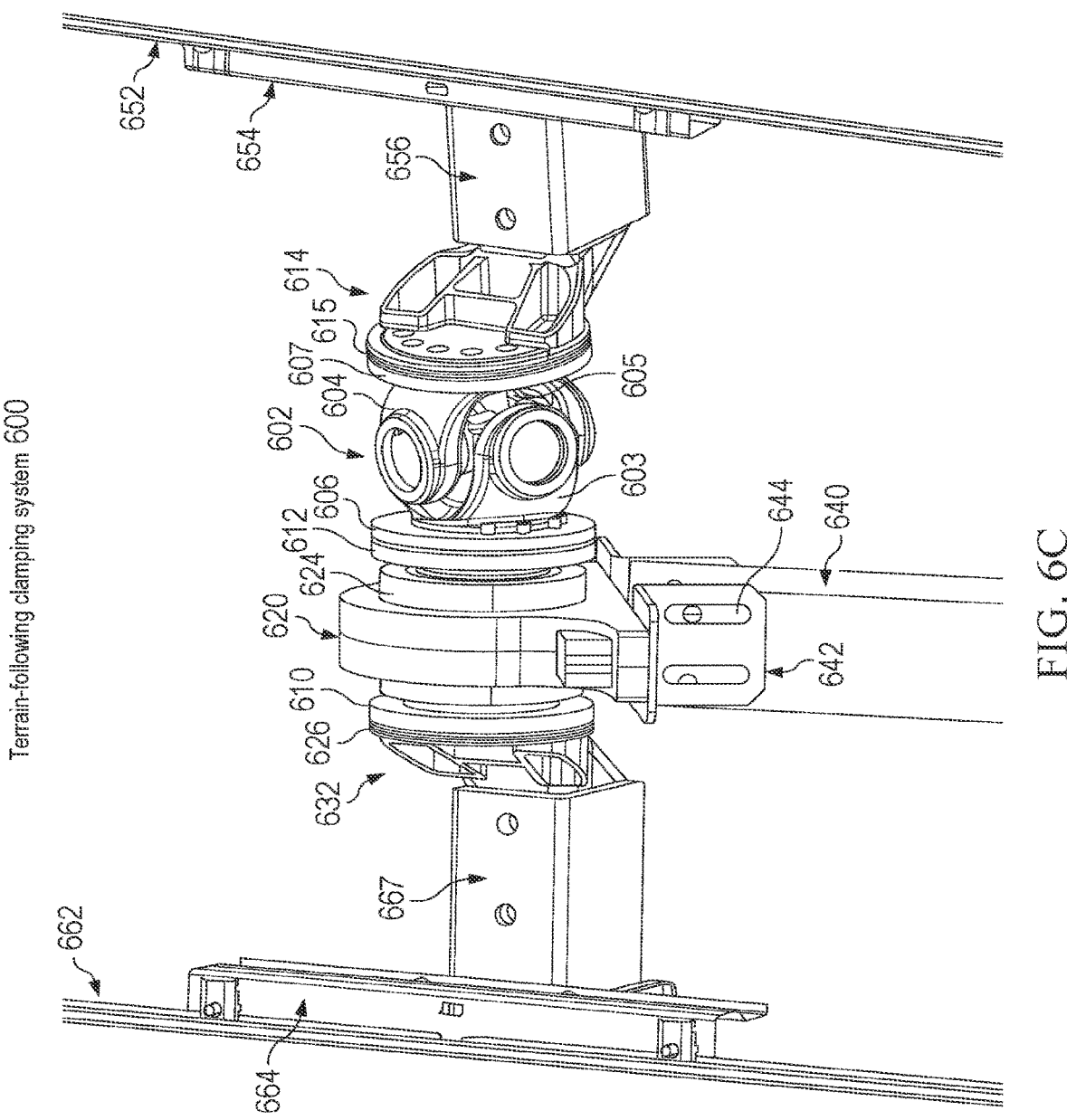

FIG. 6C illustrates a back view of an example terrain-following clamping system according to some embodiments of the present invention.

Figure 6D:
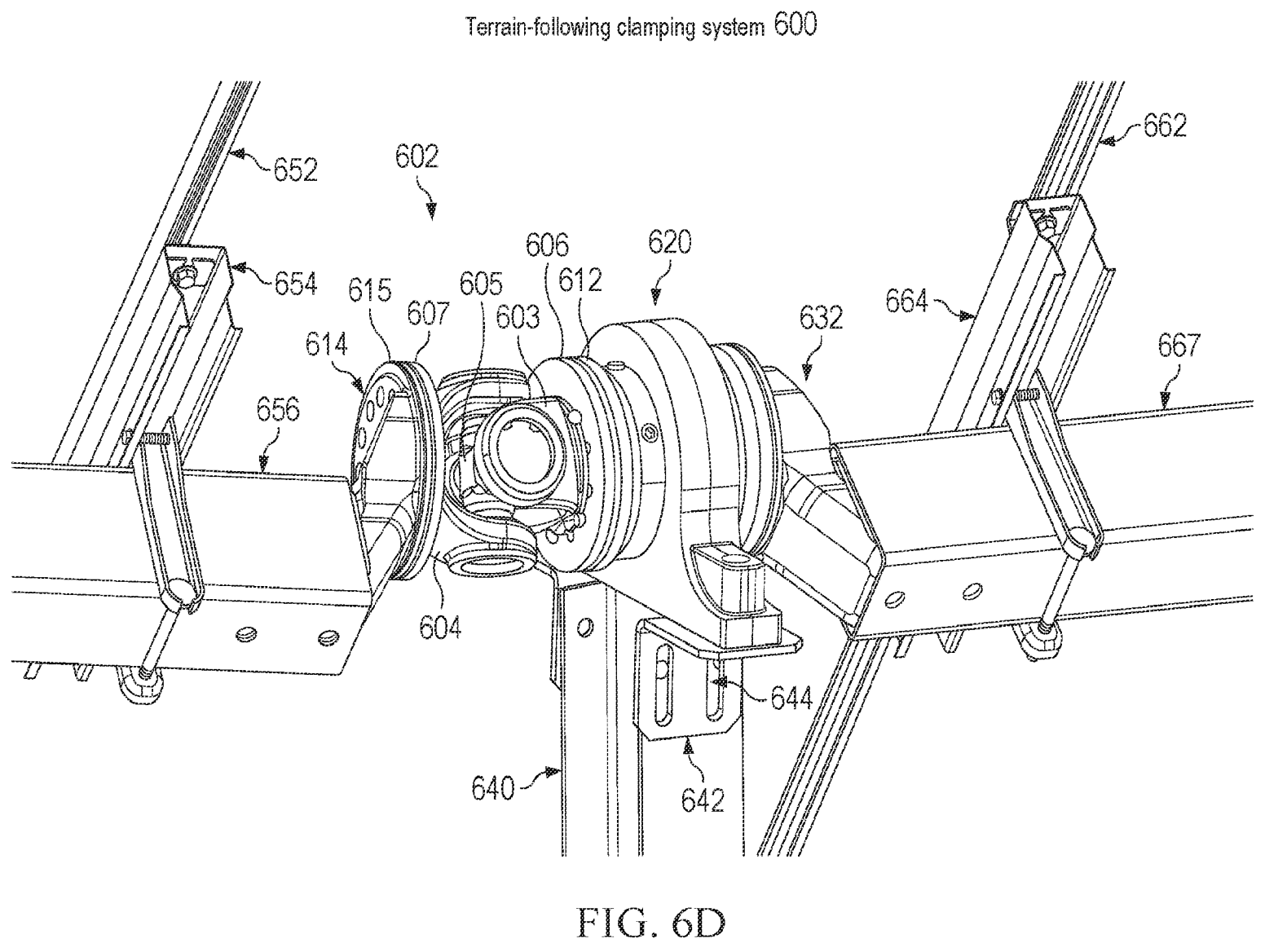

FIG. 6D illustrates a front view of an example terrain-following clamping system according to some embodiments of the present invention.

Figure 6E:
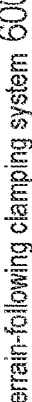

FIG. 6E illustrates a front perspective view of an example terrain-following clamping system according to some embodiments of the present invention.

Figure 6F:
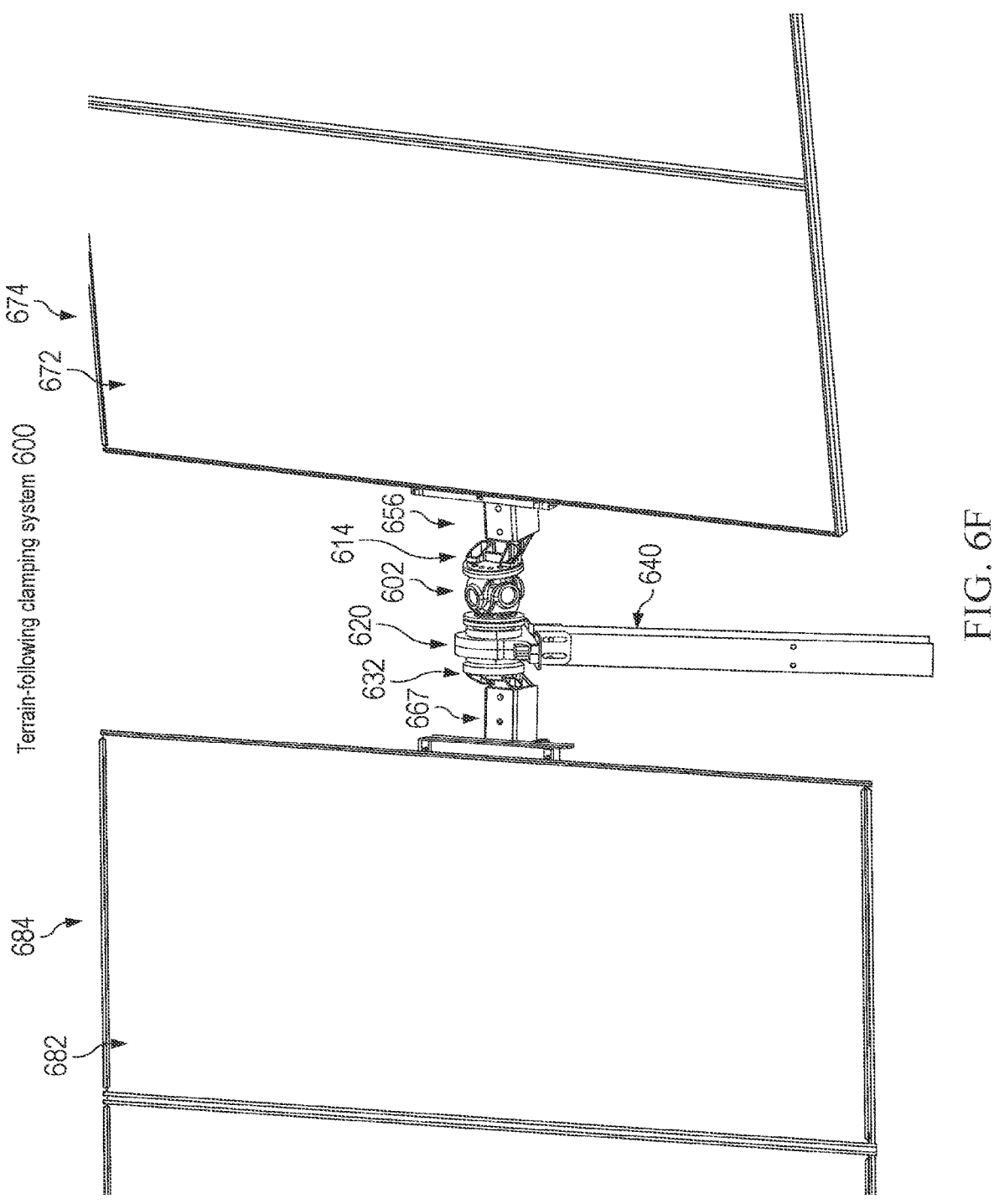

FIG. 6F illustrates a back view of an example terrain-following clamping system with solar decks according to some embodiments of the present invention.

Figure 6G:
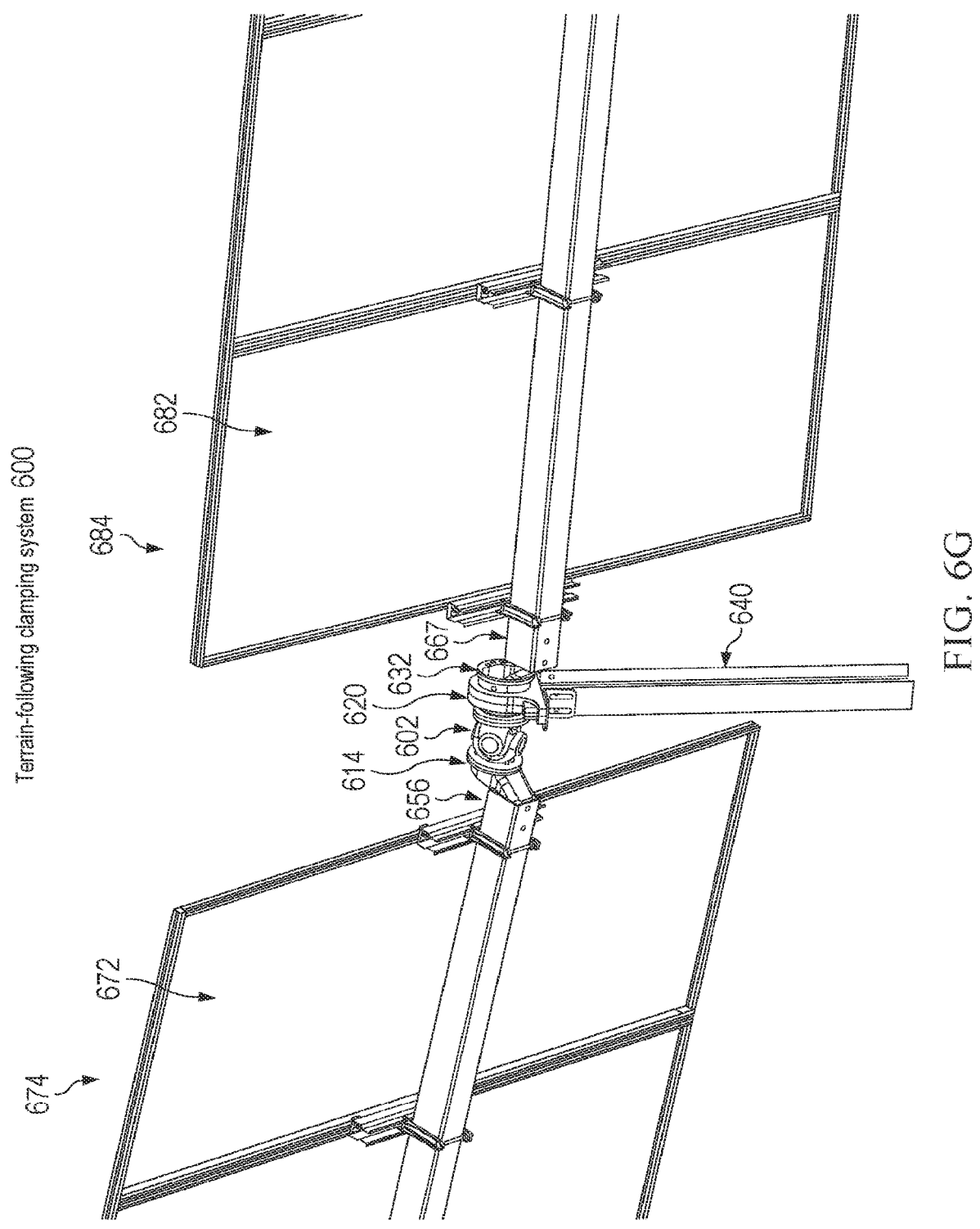

FIG. 6G illustrates a front perspective view of an example terrain-following clamping system with solar decks according to some embodiments of the present invention.

Figure 7A:
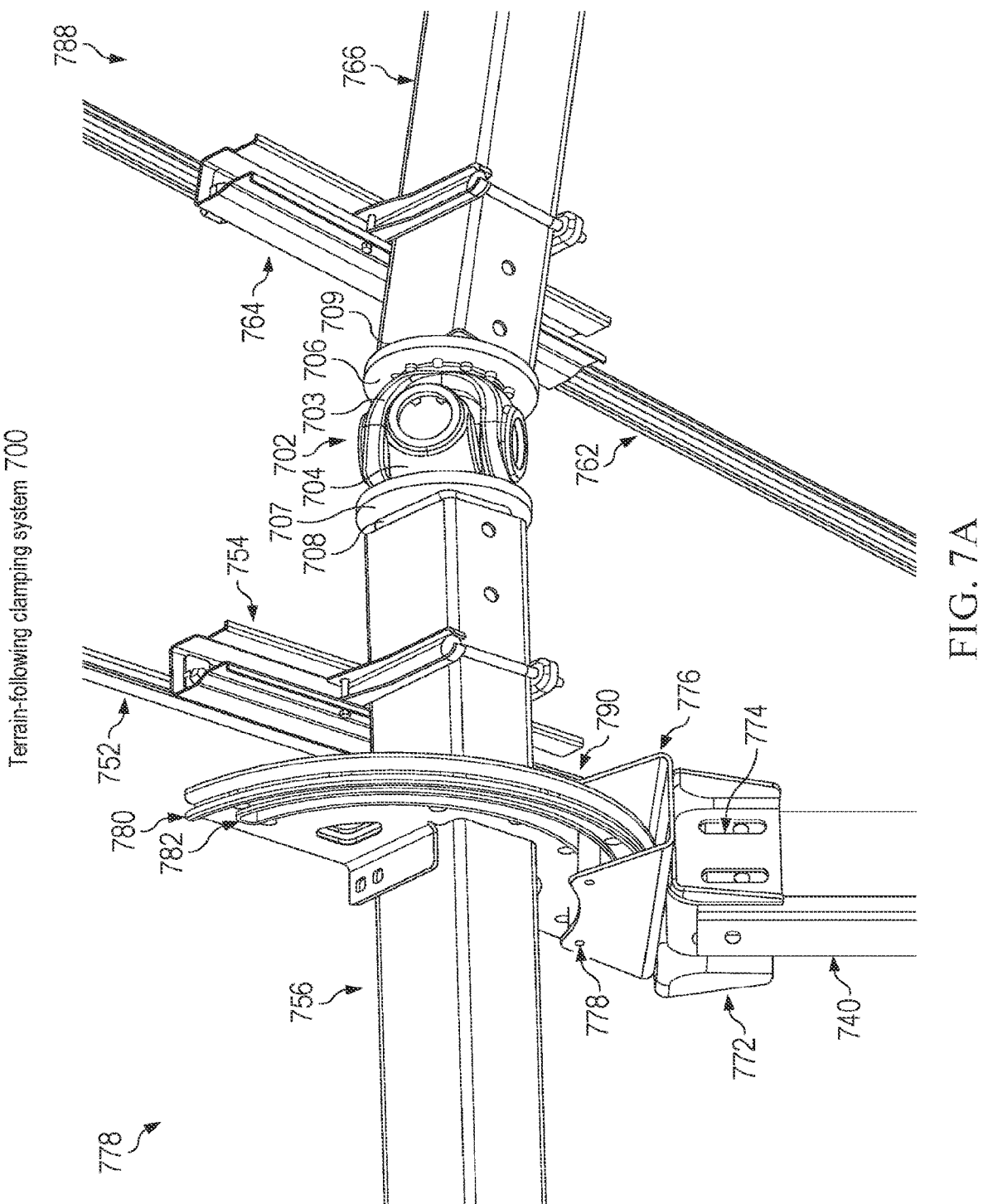

FIG. 7A illustrates a front perspective view of an example articulating clamping system in which an articulating joint is offset from the clamping post according to some embodiments of the present invention.

Figure 7B:
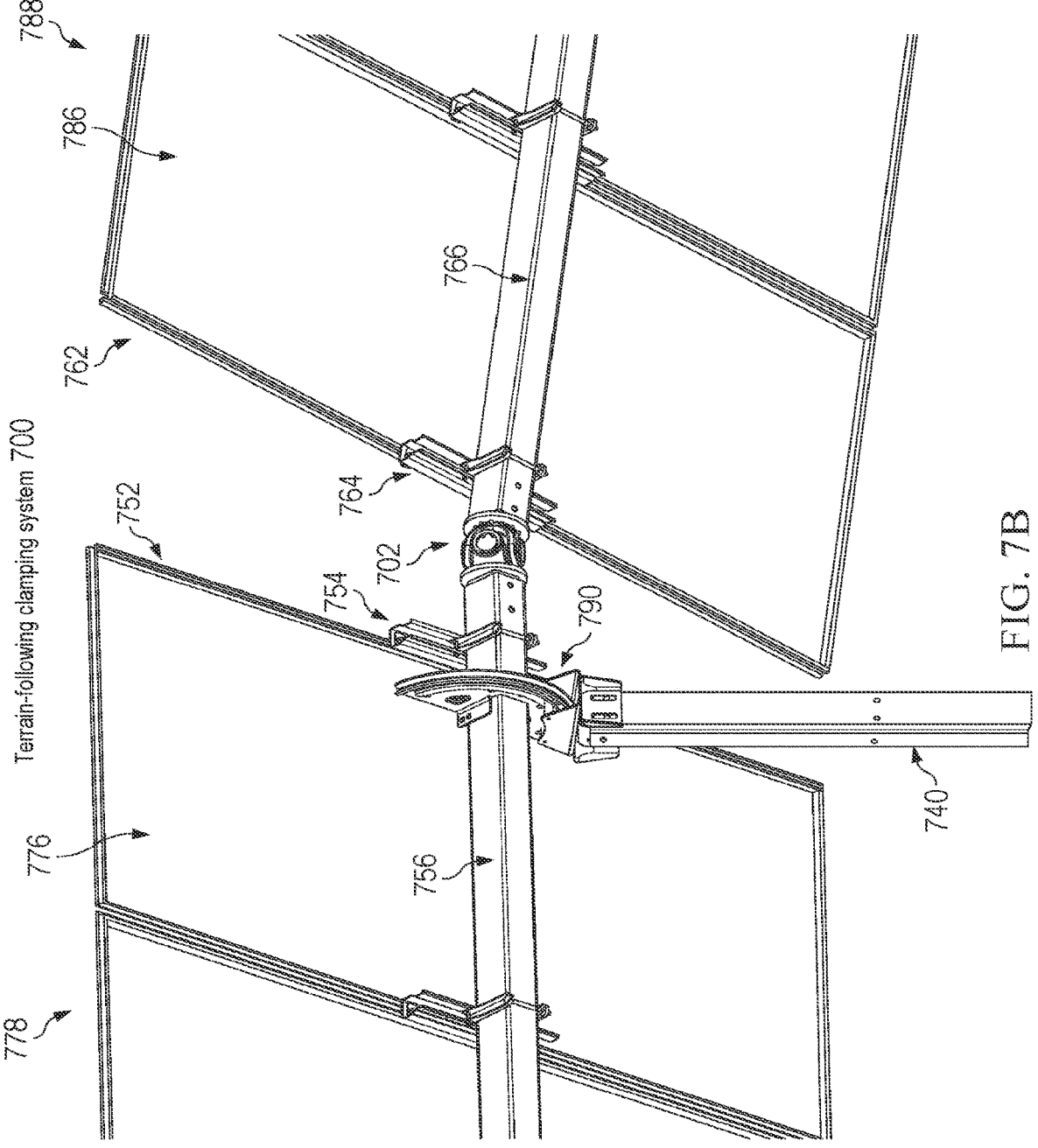

FIG. 7B illustrates a front perspective view of an example articulating clamping system in which an articulating joint is offset from the clamping post and with solar decks according to some embodiments of the present invention.

Figure 8A:
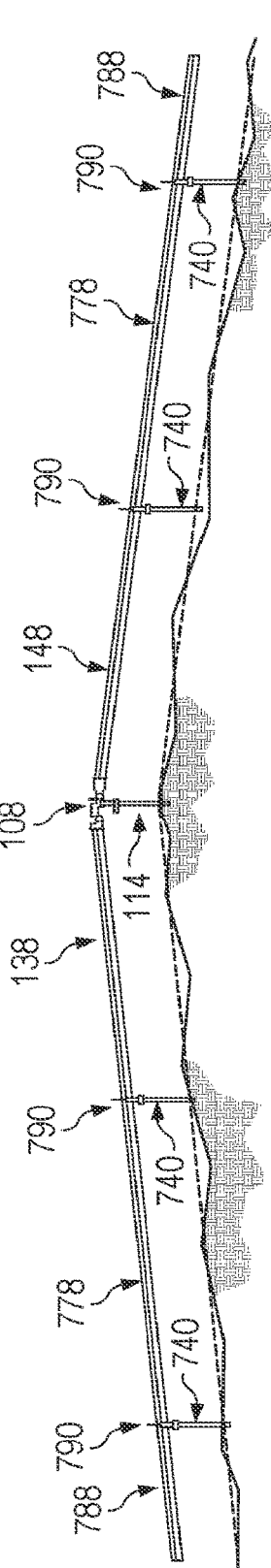

FIG. 8A is a diagram illustrating a terrain-following tracker system including a drive system and clamping systems according to some embodiments of the present invention.

Figure 8B:
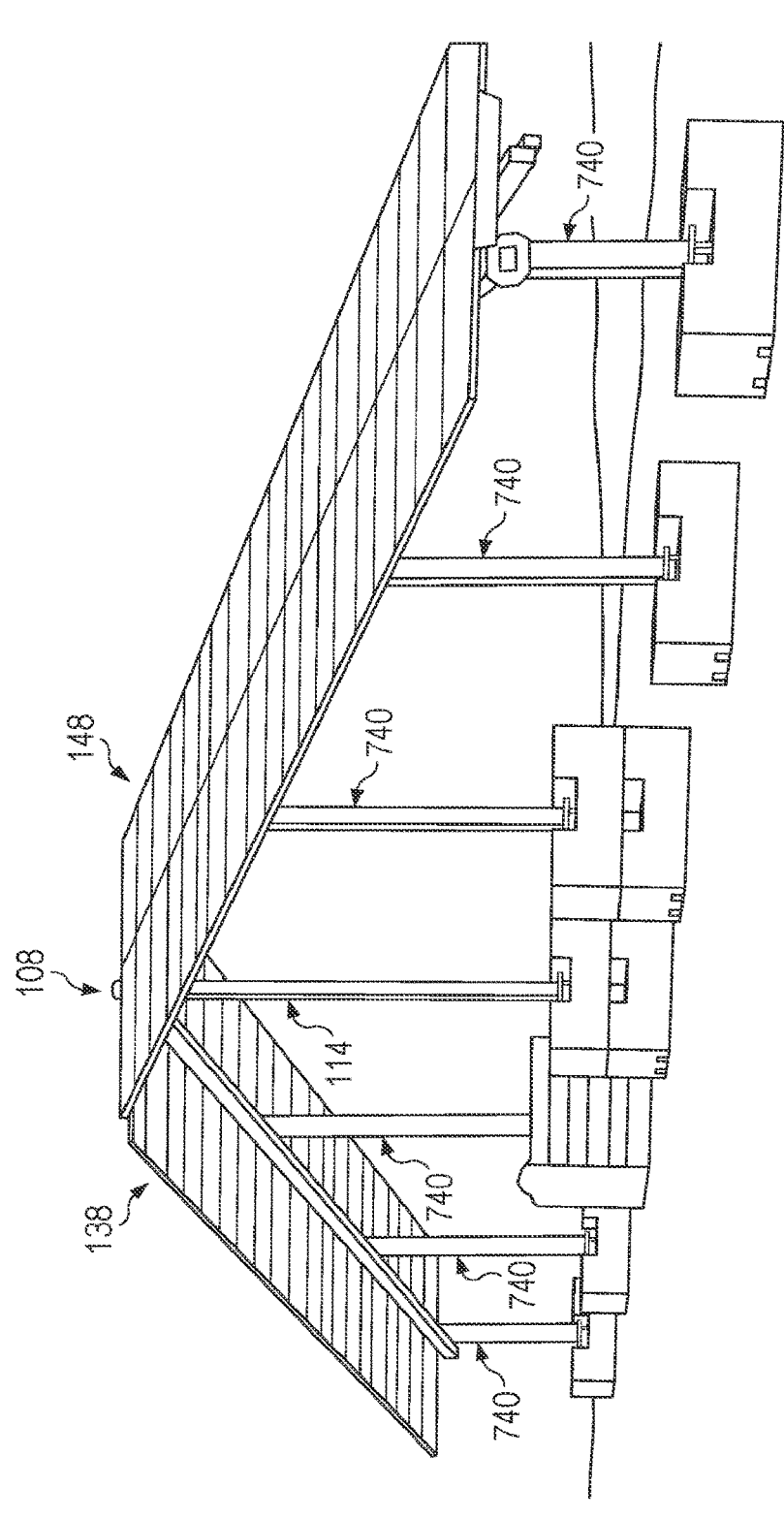

FIG. 8B illustrates a front perspective view of a terrain-following tracker system including a drive system, non-articulating clamping systems and untilted solar canopies, according to some embodiments of the present invention.

Figure 8C:
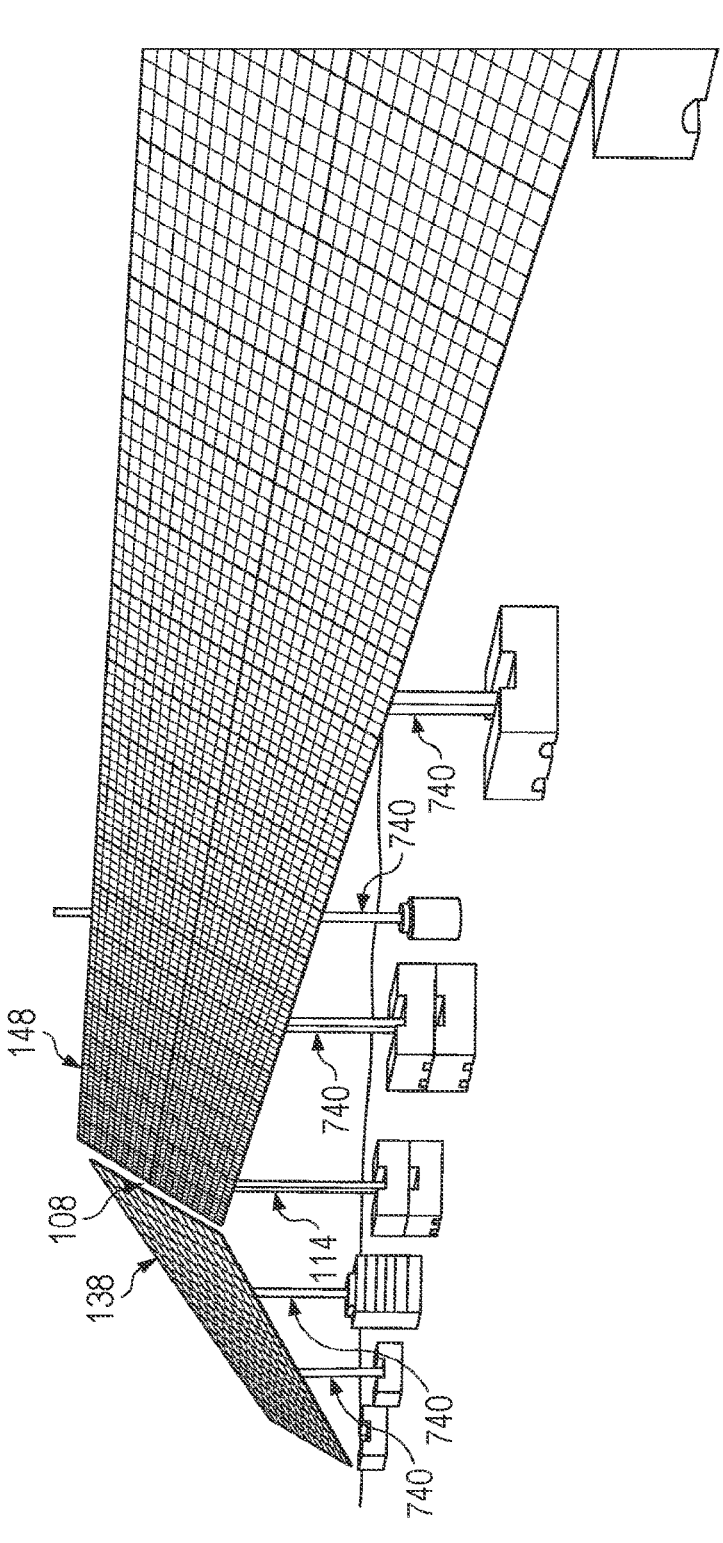

FIG. 8C illustrates a front perspective view of a terrain-following tracker system including a drive system, non-articulating clamping systems and tilted solar canopies, according to some embodiments of the present invention.

Figure 9:
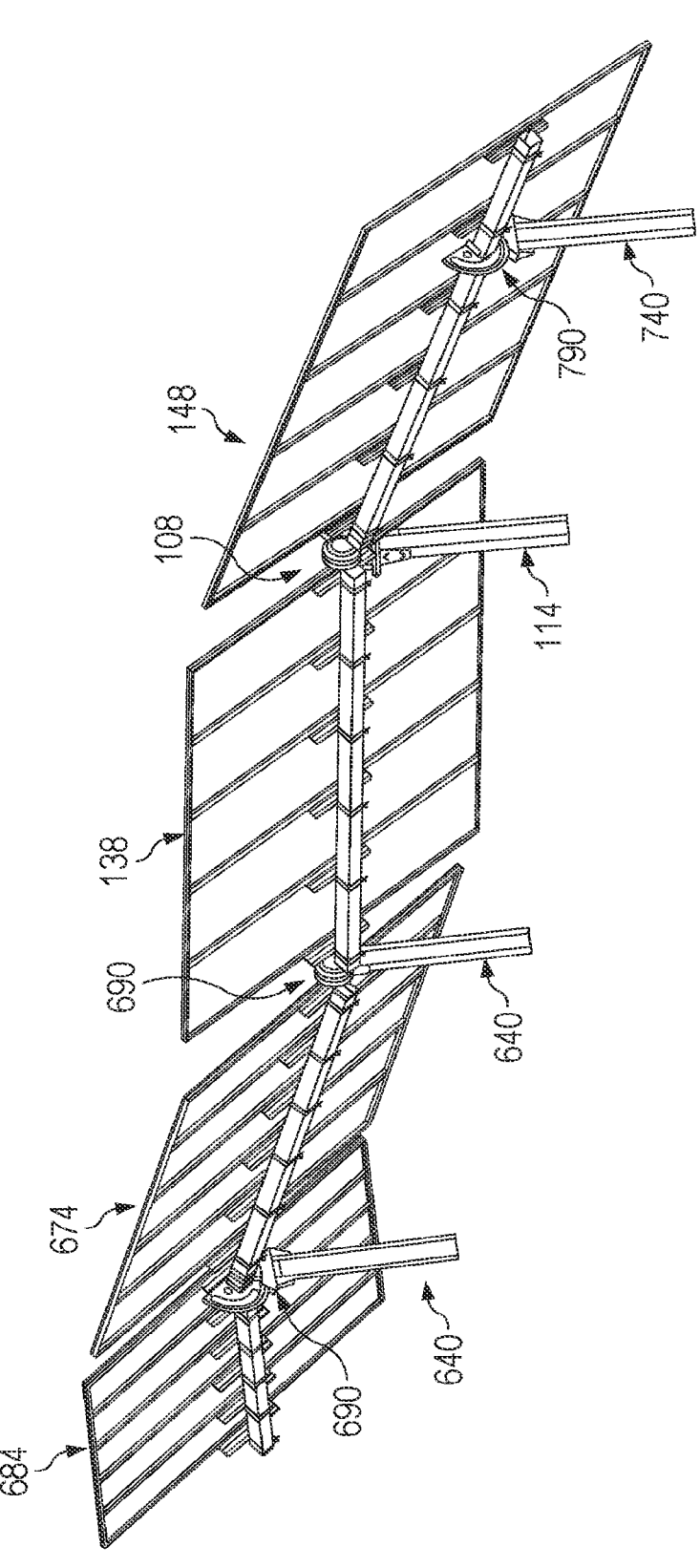

FIG. 9 is a diagram illustrating a front perspective view of a terrain-following tracker system including a drive system, articulating clamping systems, a non-articulating clamping system with tilted solar canopies, according to some embodiments of the present invention.

Figure 10:
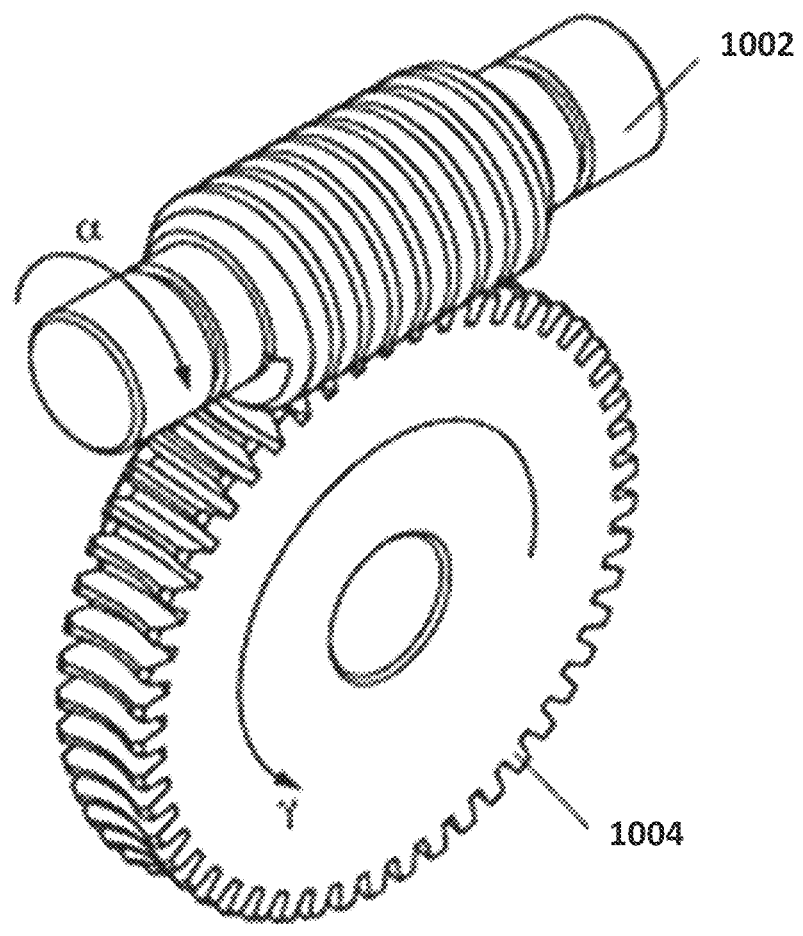

FIG. 10 is a diagram illustrating a portion of an example drive.

DETAILED DESCRIPTION

A terrain-following tracker system includes solar canopies connected to each other by a terrain-following drive system and/or by a terrain-following clamping system.

The terrain-following drive system causes tilting of the first solar canopy about a first axis and tilting of the second solar canopy about a second axis. The drive system includes a drive, an articulating joint, a first output shaft, and a second output shaft. The drive includes a slewing drive that may include a ring gear rotatable by a worm screw. The worm screw may be rotated by a drive motor. Along a first side relative to the drive, the drive is coupled to the articulating joint, which is coupled to the first output shaft. The first output shaft is coupled to the first solar canopy. Along a second, opposite side relative to the drive, the drive is further coupled to a second output shaft. On the first side, rotation of the ring gear causes rotation of the articulating joint, which in turn causes rotation of the first output shaft and tilting of the first solar canopy about the first axis. Along the second side, rotation of the ring gear causes rotation of the second output shaft, which in turn causes tilting of the second solar canopy about the second axis.

In some embodiments, the articulating joint may enable angular adjustment between the first axis and the second axis by several degrees, e.g., up to 25 degrees (whether vertically or laterally or both). In some embodiments, an articulating joint may be disposed on each side of the drive to double the amount of adjustment available between the first axis and the second axis.

In some embodiments, the first solar canopy includes a first torque tube, first solar panels and a first support structure attaching the first solar panels to the first torque tube. In some embodiments, the second solar canopy includes a second torque tube, second solar panels and a second support structure attaching the second solar panels to the second torque tube.

The terrain-following tracker system may be secured to a terrain surface via a drive post (e.g., posts with an adjacent, proximate, or attached drive system) and clamping or idle posts (e.g., posts without an adjacent, proximate, or attached drive system). Because of the articulating joint, each drive post or clamping post may not have strict height requirements. Thus, instead of having to grade the terrain to be substantially planar, the articulating joint assists the tracker system to be terrain following.

To impart additional terrain following functionality, the drive system may be attached to the drive post in a manner that permits tilting of the drive system relative to the drive post. In some embodiments, the terrain-following tracker system may include a pivotable post bracket system.

As indicated above, the terrain-following tracker system may also include terrain-following clamping systems. Terrain-following clamping systems may securely attach adjacent solar canopies to each other or attach a solar canopy to a clamping post. For example, terrain-following clamping systems may securely attach the first solar canopy to a third solar canopy along the first side of the drive. Terrain-following clamping systems may include articulating clamping systems or non-articulating clamping systems.

An articulating clamping system has an adjacent or proximate articulating joint, while a non-articulating clamping system is lacking an adjacent or proximate articulating joint. For example, an articulating clamping assembly positioned between the first and third solar canopies may cause the third solar canopy to tilt at a third angle which may be different from the first angle or the second angle. As another example, a non-articulating clamping assembly positioned between the first and third solar canopies may cause the third solar canopy to tilt at approximately the first angle, to match the tilt of the adjacent solar panel.

Figure 1:
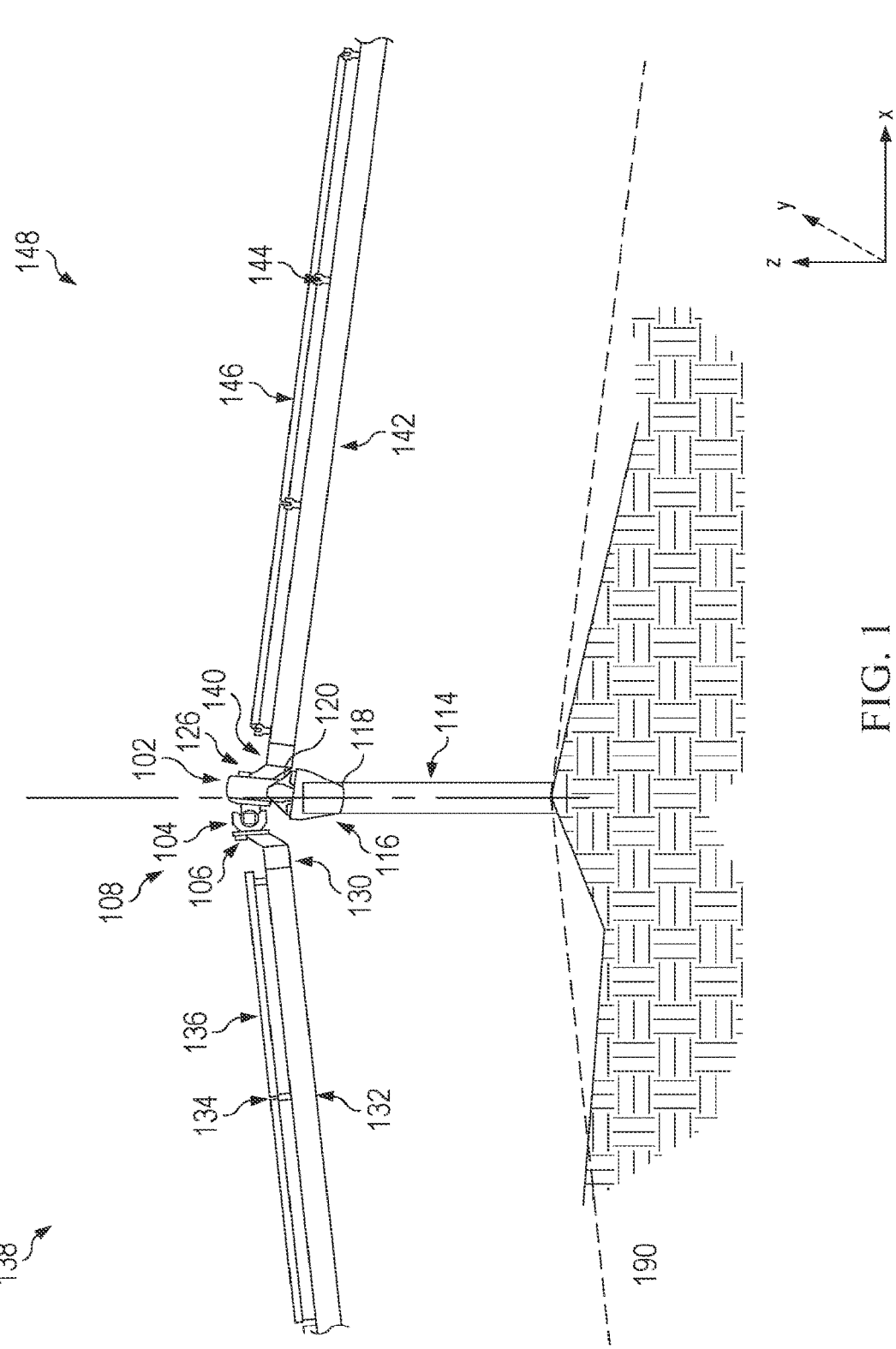
FIG. 1 is a diagram illustrating an example terrain-following tracker system according to some embodiments of the present invention.

FIG. 1 illustrates an example terrain-following tracker system 100 according to some embodiments of the present invention. The terrain-following tracker system 100 includes two solar canopies 138 and 148 connected to each other by a terrain-following drive system 108. The first solar canopy 138 may be tiltable about a first axis. The second solar canopy 148 may be tiltable about a second axis.

In some embodiments, the drive system 108 includes a drive 102 coupled on a first side (left side in FIG. 1) to an articulating joint 104, which is coupled to a first output shaft 106. The drive 102 is further coupled on a second, opposite side (right side in FIG. 1) to a second output shaft 126. The first output shaft 106 is coupled to the first solar canopy 138. The second output shaft 126 is coupled to the second solar canopy 148. Rotation of the drive 102 causes tilting of the first solar canopy 138 about the first axis and tilting of the second solar canopy 148 about the second axis. Because of the articulating joint 104, the first axis about which the first solar canopy 138 tilts and second axis about which the second solar canopy 148 tilts need not be the same. In some embodiments, the articulating joint 104 enables the first axis and the second axis to differ by up to about 25 degrees in any direction (whether vertically or horizontally or both). In other embodiments, the articulating joint 104 may enable the first axis and the second axis to differ by up to about a different maximum number of degrees, e.g., 25 degrees.

In some embodiments, the first solar canopy 138 includes a first torque tube 132, first solar panels 136 and a first support structure 134 attaching the first solar panels to the first torque tube 132. In some embodiments, the first support structure 134 includes lateral beams extending in a direction transverse to the first torque tube 132 (e.g., y-direction in FIG. 1).

In some embodiments, the second solar canopy 148 includes a second torque tube 142, second solar panels 146 and a second support structure 144 attaching the second solar panels 146 to the second torque tube 142. In some embodiments, the second support structure 144 includes lateral beams extending in a direction transverse to the second torque tube 142 (e.g., y-direction in FIG. 1).

In some embodiments, the drive 102 includes a slewing drive that may include a ring gear rotatable by a worm screw. The threads of the worm screw engage teeth of the ring gear. Rotation of the worm screw causes the ring gear to rotate while the threads of the worm screw hold the ring gear in place. On a first side, rotation of the ring gear of the drive 102 causes rotation of articulating joint 104, which in turn causes rotation of the first output shaft 106, which in turn causes the first solar canopy 138 to tilt about its first axis. On the second side, rotation of the ring gear of the drive 102 causes rotation of the second output shaft 126, which in turn causes the second solar canopy 148 to tilt about its second axis. In some embodiments, the first axis is colinear with the center of mass of first solar canopy 138, and the second axis is colinear with the center of mass of the second solar canopy 148. In some embodiments, the first axis is not colinear with the center of mass of first solar canopy 138, and the second axis is not colinear with the center of mass of the second solar canopy 148. Thus, in such embodiments, the motor driving the drive 102 may require additional torque.

In some embodiments, the articulating joint 104 includes a universal joint. In some embodiments, the articulating joint 104 may include a driving yoke, a driven yoke, and a spider (a cross). Rotation of the driving yoke cause the driven yoke to rotate. Because of the design of the universal joint, a torque tube coupled on the side of the driving yoke need not be colinear with a torque tube coupled on the side of the driven yoke. In some embodiments, rotation of the driven yoke causes the first torque tube 130 to revolve about the first axis, which results in tilting of the first solar canopy 138. In some embodiments, the articulating joint 104 may enable angular adjustment between the first axis and the second axis by several degrees, e.g., up to 25 degrees (whether vertically or laterally or both). In some embodiments, a second articulating joint (not shown) may be disposed on the second side of the drive 102 to double the amount of adjustment available between the first axis and the second axis. The second articulating joint 104 may be desired when the terrain is significantly more uneven than a single articulating joint 104 can handle.

In some embodiment, the first output shaft 106 includes a first torque tube interface 130 designed to attach to the first torque tube 132. Similarly, the second output shaft 126 includes a second torque tube interface 140 designed to attach to the second torque tube 142. In some embodiments, the second output shaft 126 is coupled to the drive 102 without an intermediate articulating joint. However, as stated above, in some embodiments, an articulating joint may be included therebetween.

The terrain-following tracker system 100 may include a drive post 114 and one or more clamping posts (e.g., one or more posts without a drive system 102). Because of the articulating joint 104, each post may be equal in height, substantially equal in height, or may have different heights. Instead of having to grade the terrain to be substantially planar, the articulating joint 104 assists the tracker system 100 to be terrain following. In some embodiments, as will be further illustrated in FIGS. 6A-6G, 7A-7B, 8A-8C, and 9, the terrain-following tracker system 100 may be implemented in conjunction with articulating clamping systems or non-articulating clamping systems.

To add additional terrain-following capability, in some embodiments, the terrain-following tracker system 100 may further include a pivotable post bracket system 116 to support additional adjustment between the first axis about which the first solar canopy 138 tilts and the second axis about which the second solar canopy 148 tilts. In some embodiments, the pivotable post bracket system 116 may only enable additional adjustments in the vertical direction.

In some embodiments, the pivotable post bracket system 116 includes a pivoting post bracket 118 attached to the drive post 114 and a drive bracket 120 attached to the drive 102. The pivotable post bracket system 116 enables the drive 102 to pivot with regard to the post 114, which enable the drive 102 to adjust its rotational axis about which it rotates. In some embodiments, the pivotable post bracket system 116 may be part of the drive system 108.

Components may be coupled to one another using any suitable attachment mechanisms, e.g., fasteners such as bolts and screws, welding, or integral formation such as single-piece casting.

Figure 2:
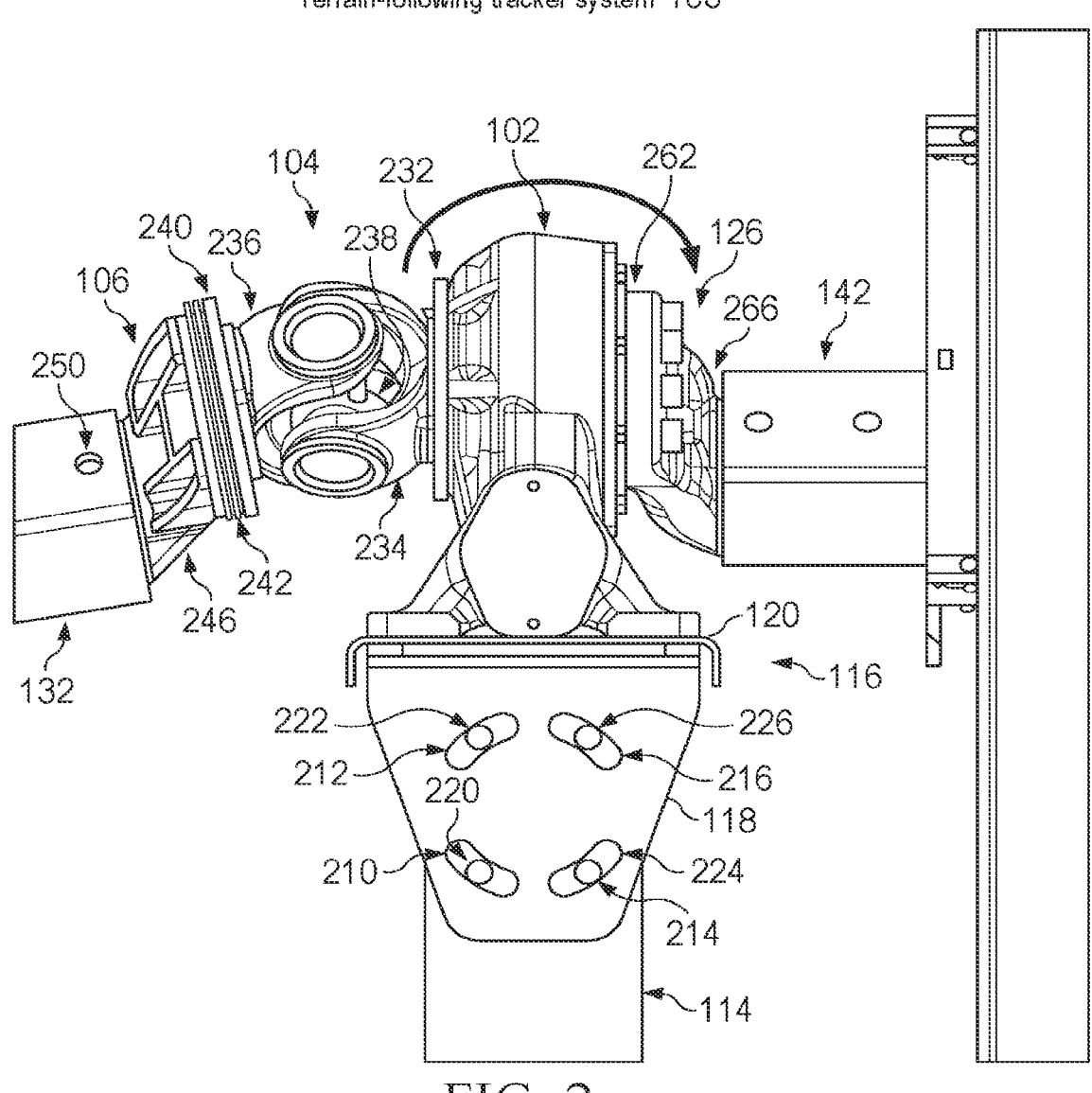
FIG. 2 is a diagram illustrating an example terrain-following tracker system including a pivotable post bracket system according to some embodiments of the present invention.

FIG. 2 illustrates the terrain-following tracker system 100 including the drive system 108 and the pivotable post bracket system 116 according to some embodiments of the present invention.

As shown, the drive system 108 includes the drive 102 coupled on the first side to the articulating joint 104, which is coupled to the first output shaft 106. The drive 102 is further coupled on the second side to the second output shaft 126. The first output shaft 106 is coupled to the first solar canopy 138. The second output shaft 126 is coupled to the second solar canopy 148. As indicated above, rotation of the drive 102 causes tilting of the first solar canopy 138 about the first axis and tilting of the second solar canopy 148 about the second axis. Because of the articulating joint 104, the first axis about which the first solar canopy 138 tilts and second axis about which the second solar canopy 148 tilts need not be the same.

As shown, the articulating joint 104 includes a driving yoke 234, a driven yoke 236, and a spider 238 connecting the driving yoke 234 to the driven yoke 236. The driving yoke 234 may rotate about the first axis, and the driven yoke 236 may rotate about the second axis, which may be the same or a different axis. The articulating joint 104 may contain a driving yoke bracket 232 configured to attach to the drive 102. In some embodiments, the articulating joint 104 may contain a driven yoke bracket 240, which attaches to a first output shaft bracket 242 of the first output shaft 106. In some embodiments, the first output shaft 106 may contain an offsetting link 246 attached to a first torque tube interface (see element 130 of FIG. 3). The offsetting link 246 drops the position of the first torque tube interface 130 and thus the position of the first torque tube 132 and its load of solar panels and solar panel structure, bringing the center of mass of the attached first solar canopy 138 closer to the first axis about which it tilts.

Attachment of the first torque tube interface 130 to the first torque tube 132 may be via a respective torque tube opening 250 and an output shaft opening (see element 252 of FIG. 3) of the first torque tube interface 130. A fastener such as a pin may be secured in the torque tube opening 250 and the output shaft opening 252 to attach the torque tube 132 to the first output shaft 106. Due to the offsetting link 246, rotation of the driven yoke 236 causes the first torque tube 132 to revolve about an adjusted axis. The offsetting link 246 may have any orientation, shape or configuration, and is not limited to the sloped configuration as illustrated in FIG. 2.

The drive 102 may attach to a second output shaft bracket 262 of the second output shaft 126. In a similar manner to the first torque tube interface 130, second output shaft 126 may have a second torque tube interface (see element 140 of FIG. 3), which may attach to the second torque tube 142. For example, the second output shaft 126 may also include a second offsetting link 266 that repositions the second torque tube interface 140. The offsetting link 266 may have any orientation, shape or configuration, and is not limited to a sloped configuration as illustrated in FIG. 2. The offsetting link 266 drops the position of the second torque tube interface 140 and thus the position of the second torque tube 142 and its load of solar panels and solar panel structure, bringing the center of mass of the attached second solar canopy 148 closer to the second axis about which it tilts.

In some embodiments, the pivoting post bracket 118 of the pivotable post bracket system 116 contains one or more fastener slots 210, 212, 214, 216. Although four fastener slots are illustrated, it is understood that the pivotable post bracket system 116 may include any number of fastener slots. In some embodiments, the fastener slots 210, 212, 214, 216 may be symmetrically or asymmetrically distributed. In some embodiments, the fastener slots 210, 212, 214, 216 may have a curved or arcuate profile to enable pivotable motion. Fasteners 220, 222, 224, and 226 within the fastener slots 210, 212, 214, 216 may affix the pivoting post bracket 118 to the drive post 114. The pivoting post bracket 118 may pivot along the fastener slots 210, 212, 214, 216. Because the drive system 108 is attached to the pivotable post bracket system 116, pivoting of the pivoting post bracket 118 causes the drive system 108 to pivot.

In some embodiments, fasteners that affix the pivotable post bracket 118 in a fixed position, e.g., to improve fixed alignment of the drive 102. In some embodiments, fasteners that affix the pivotable post bracket 118 may enable dynamic repositioning during use, like the articulating joint 104, e.g., to enable additional terrain following capability.

Figure 3:
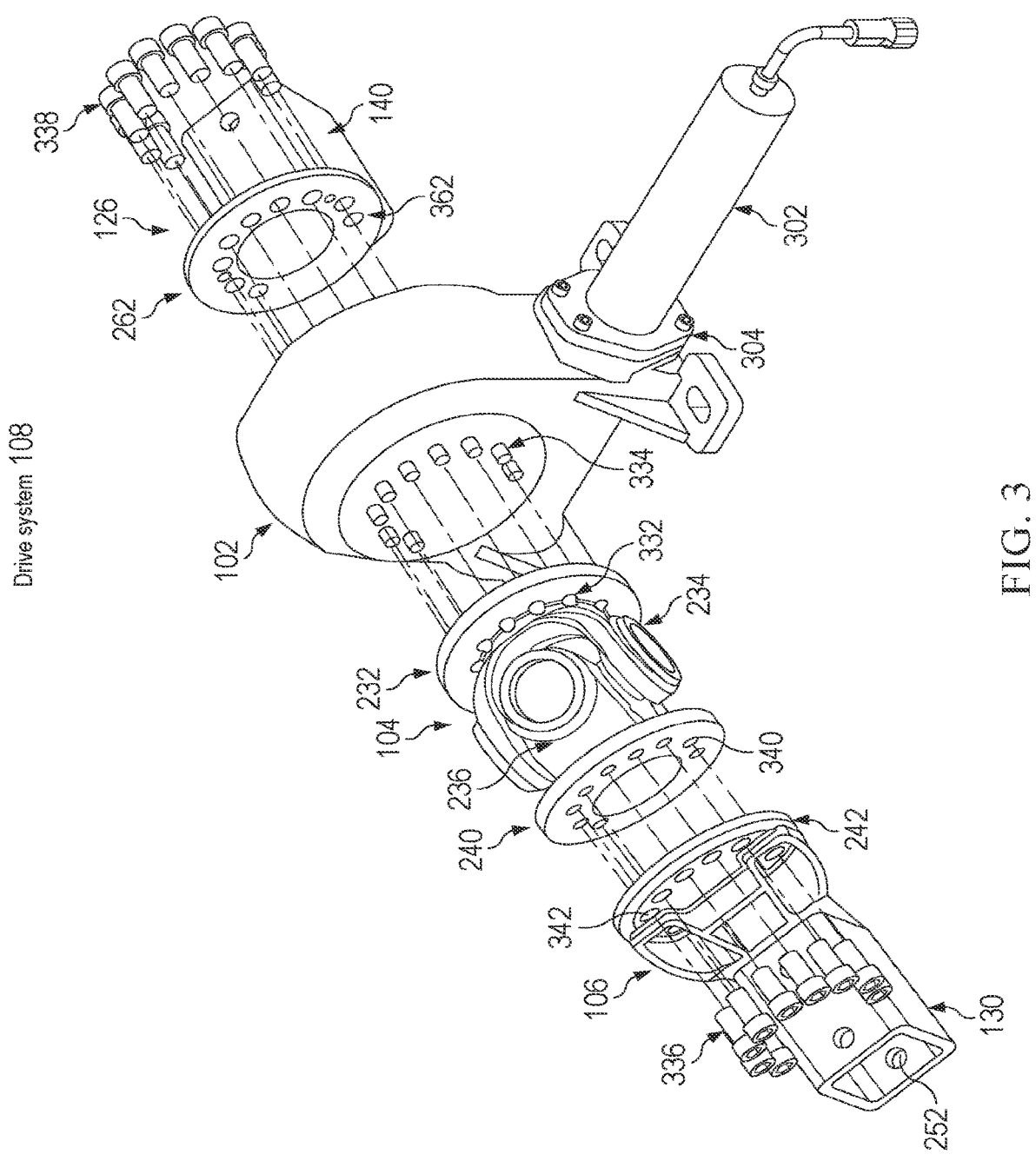
FIG. 3 is a diagram illustrating an exploded perspective view of an example drive system according to some embodiments of the present invention.

FIG. 3 illustrates an example drive system 108 in an exploded perspective view according to some embodiments of the present invention. As shown, the drive system 108 includes the drive 102 coupled to the articulating joint 104, which is coupled to the first output shaft 106. The drive 102 is further coupled to the second output shaft 126. The first output shaft 106 is designed to couple to the first solar canopy 138. The second output shaft 126 is designed to couple to the second solar canopy 148.

As shown, the drive system 108 further includes a drive motor 302 that rotates the worm screw, which causes rotation of the ring gear therein. The drive motor 302 may contain any suitable motor, including but not limited to a hydraulic motor, an electric motor, or a pneumatic motor. The drive motor 302 may be connected to the drive 102 via a drive motor adapter 304. In some embodiments, the drive motor 302 may contain a slew drive motor.

The driving yoke bracket 232 may be attached to the drive 102 using one or more mating fasteners 334. A mating fastener 334 (e.g., threaded bolt) may be inserted via the ring gear through holes in a first faceplate of the drive 102 into driving yoke bracket openings 332 (e.g., a threaded opening) of the driving yoke bracket 232. In some embodiments, the first mating fasteners 334 may include an elongated nut and the driving yoke bracket openings 332 may be replaced with protruding bolts. Alternatively, the first mating fasteners 334 may include a threaded bolt and the driving yoke bracket openings 332 may be through vias, and the mating fasteners 332 may be secured by nuts. Other alternatives are possible. As shown, the first mating fasteners 334 may be positioned circumferentially around a periphery of the driving yoke bracket 232.

The driven yoke bracket 240 may be attached to the first output shaft bracket 242 via driven yoke bracket openings 340, first output shaft bracket openings 342 and mating fasteners 336. To secure the driven yoke bracket 240 to the first output shaft bracket 242, a mating fastener 336 (e.g., threaded bolt) may be inserted through each driven yoke bracket opening 340 and screwed into each first output shaft bracket opening 342 (e.g., a threaded opening). Other mating fasteners such as those described above with regard to the driving yoke bracket 232 are also possible. As shown, the mating fasteners 336 may be positioned circumferentially around a periphery of the first output shaft bracket 242.

In a similar manner, mating fasteners 338 may be mated with second mating fasteners on the drive 102 to attach the second output shaft bracket 262 to the drive 102. In some embodiments, the mating fasteners 338 may include threaded bolts which extend through holes 362 in the second output shaft bracket 262 and screw into threaded holes within a second faceplate of the drive 102. Other fasteners such as those described above with regard to the driving yoke bracket 232 are also possible. As shown, the mating fasteners 338 may be positioned circumferentially around a periphery of the second output shaft bracket 262.

Similarly, the drive 102 may be attached to the second output shaft 126 via the second output shaft bracket 262. Mating fasteners (e.g., threaded bolts) may be placed through second output shaft openings 362 to attach the second output shaft bracket 262 to mating fasteners (e.g., threaded holes) of the drive 102.

The first torque tube interface 130 may have torque tube interface openings 252, through which a pin may be inserted to secure the first torque tube interface 130 to the first torque tube 132. In some embodiments, the first torque tube interface 130 may be inserted into the first torque tube 132 before affixing the pins.

Although second output shaft openings 362, driven yoke bracket openings 340 and first output shaft bracket openings 342 are shown as positioned around the periphery in a relatively semicircular pattern, any other patterns of the second output shaft openings 362, driven yoke bracket openings 340 and first output shaft bracket openings 342 are possible. Also, it is understood that the aforementioned openings are merely exemplary, and other attachment mechanisms may be implemented.

FIG. 10 is a diagram illustrating a portion of an example drive 102 (e.g., a slewing drive), which includes a ring gear 1002 and a worm screw 1004. As shown, rotation of the worm screw 1004 by a first amount in the rotational direction $\alpha$ rotates the ring gear 1002 by a second amount in the rotational direction $\gamma$.

Figure 4:
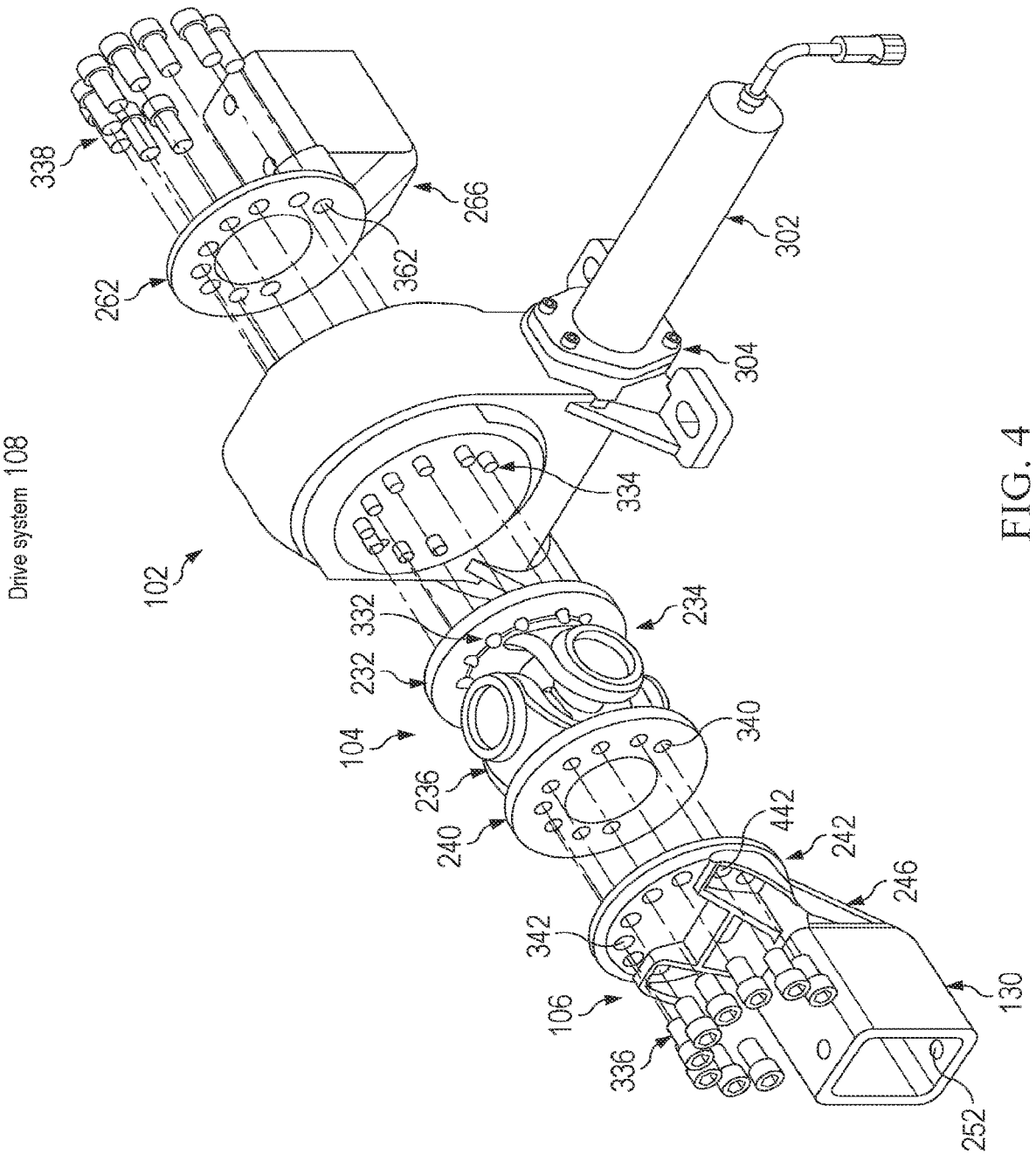
FIG. 4 is a diagram illustrating an exploded perspective view of an example drive system, with components rotated with respect to FIG. 3, according to some embodiments of the present invention.

FIG. 4 is a diagram illustrating an example drive system 108 in an exploded perspective view, with components rotated with respect to FIG. 3, according to some embodiments of the present invention. As shown, the drive system 108 includes the drive 102 coupled to the articulating joint 104, which is coupled to the first output shaft 106. The drive 102 is further coupled to the second output shaft 126. The first output shaft 106 is designed to couple to the first solar canopy 138. The second output shaft 126 is designed to couple to the second solar canopy 148.

As shown, the offsetting link 246 may be integrated with the first output shaft bracket 242 and may have offsetting link openings 442. Within the offsetting link openings 442, fasteners may be placed to attach the first output shaft 106 to the driven yoke bracket 340. In some embodiments, the offsetting link openings 442 may pass completely through the first output shaft bracket 242.

Similarly, as shown, the offsetting link 266 may be integrated with the second output shaft bracket 262 and may have offsetting link openings 362. Within the offsetting link openings 362, fasteners may be placed to attach the second output shaft 126 to the drive 102. In some embodiments, the offsetting link openings 362 may pass completely through the second output shaft bracket 262.

Figure 5A:
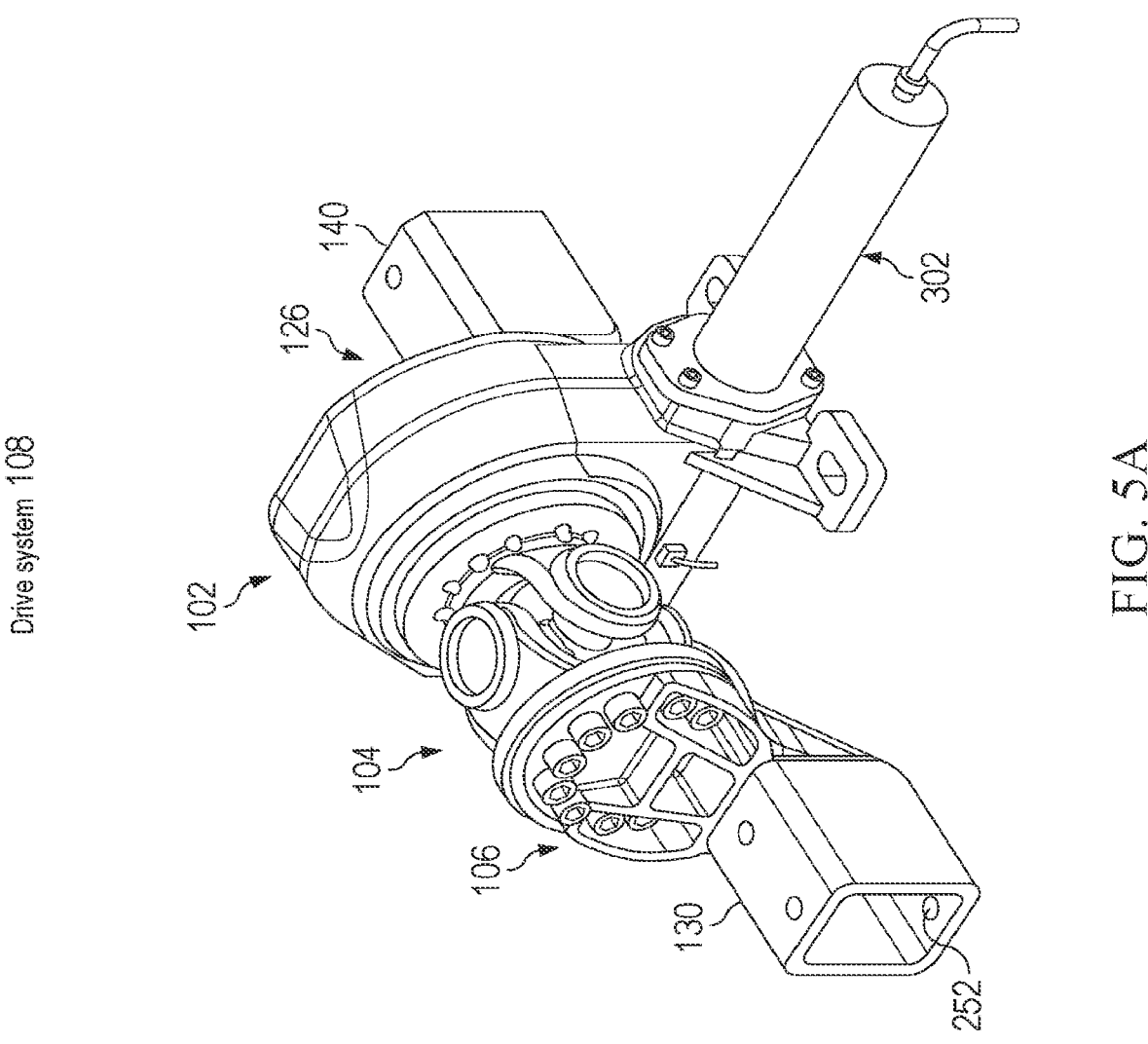
FIG. 5A illustrates an isometric view of an example drive system according to some embodiments of the present invention.

FIG. 5A illustrates an isometric view of a drive system 108 according to some embodiments of the present invention.

Figure 5B:
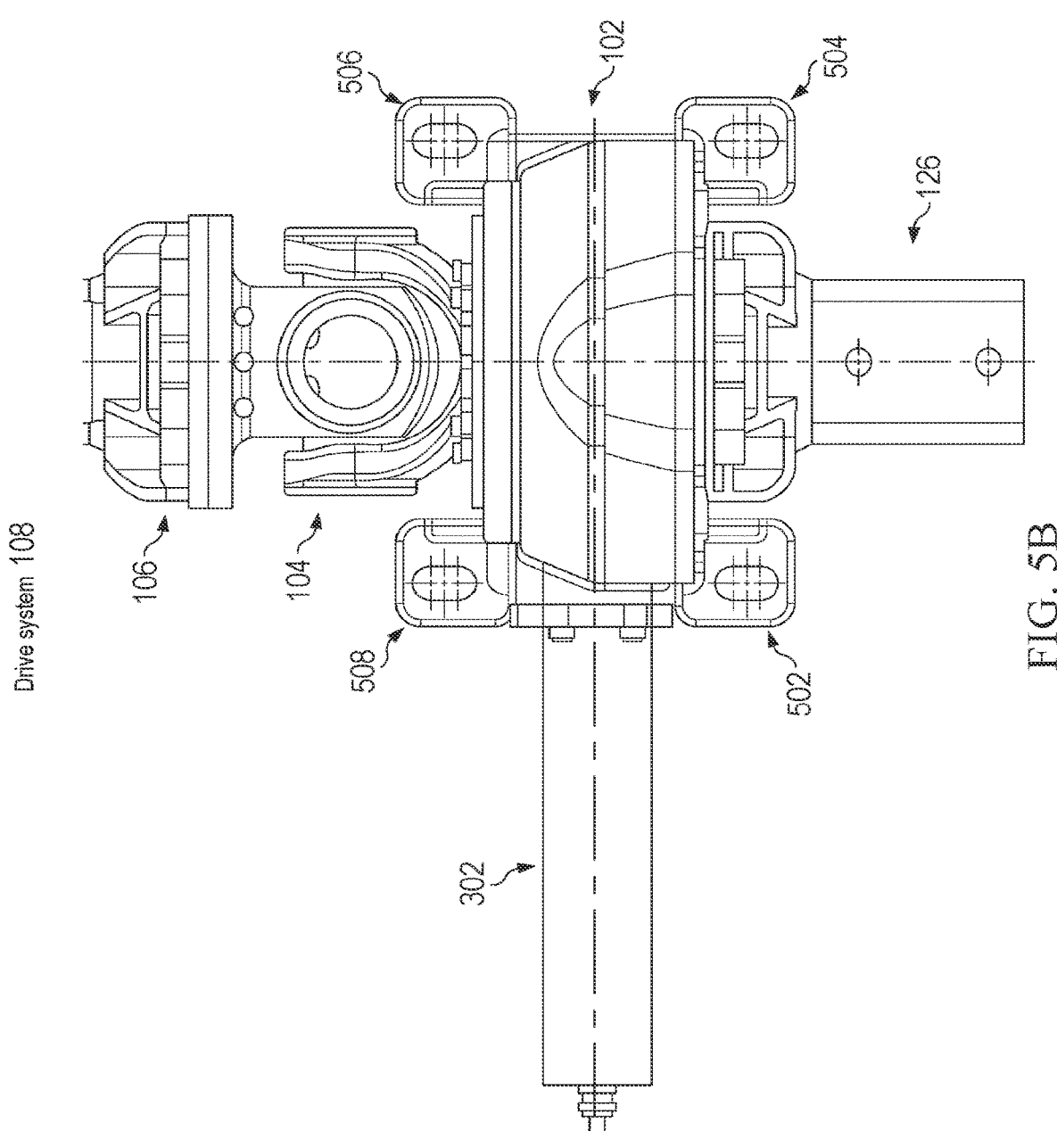
FIG. 5B illustrates a top view of an example drive system according to some embodiments of the present invention.

FIG. 5B illustrates a top view of a drive system 108 according to some embodiments of the present invention. As shown, the drive attachment brackets 502, 504, 506, and 508 are configured to attach the drive 102 to a top surface of either the drive post 114 or the pivotable post bracket system 116. The drive attachment brackets 502, 504, 506, and 508 may be distributed symmetrically or asymmetrically. In some embodiments, a fastener such as a bolt may be inserted into each of the drive attachment brackets 502, 504, 506, and 508. In some embodiments, the drive attachment brackets 502, 504, 506, and 508 may be positioned near the four corners drive 102. Although shown as having four brackets, any number of drive attachment brackets may be present.

Figure 5C:
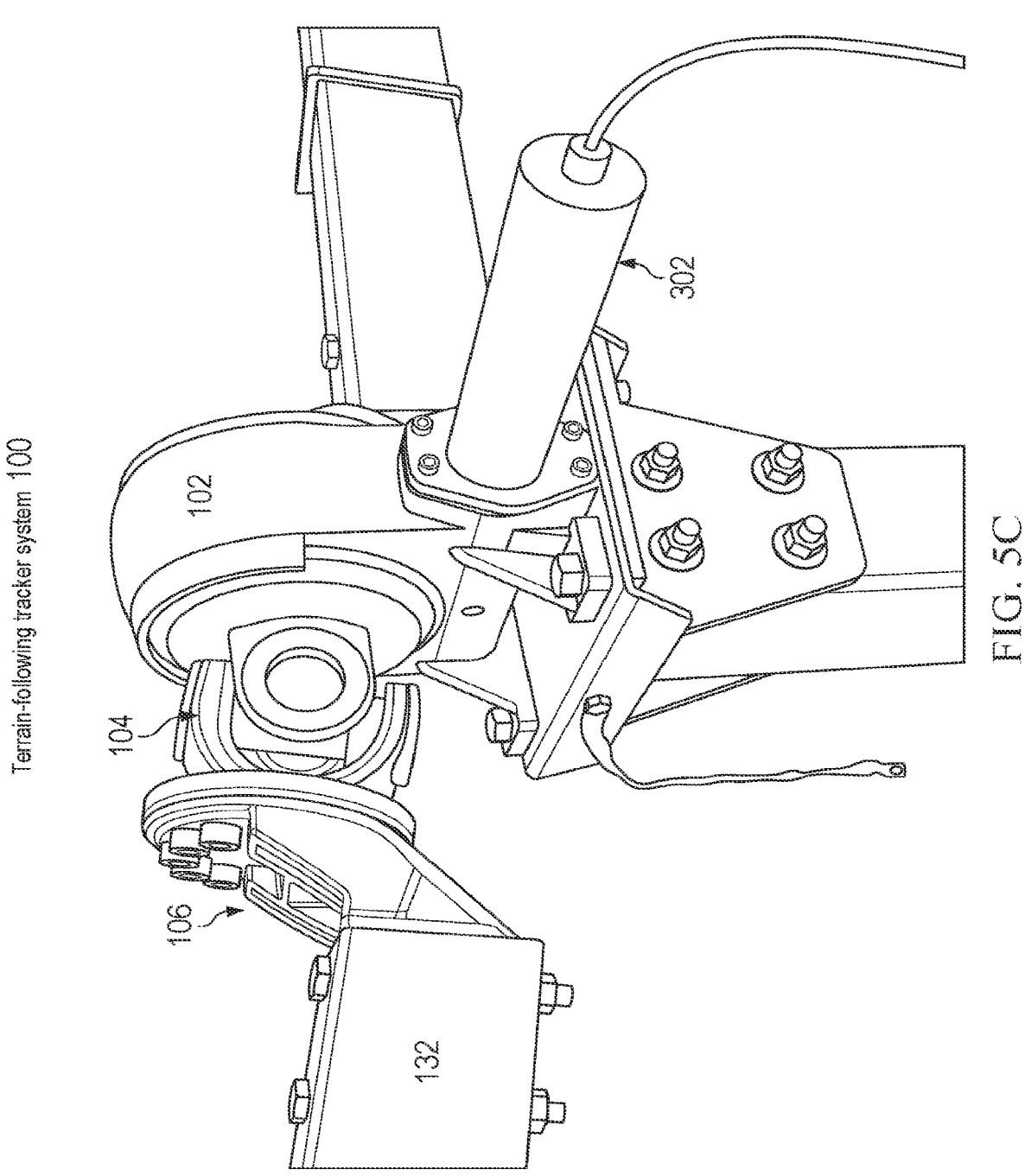
FIG. 5C illustrates a front left perspective view of a terrain-following tracker system according to some embodiments of the present invention.

FIG. 5C illustrates a front left perspective view of a terrain-following tracker system 100 100 according to some embodiments of the present invention.

Figure 5D:
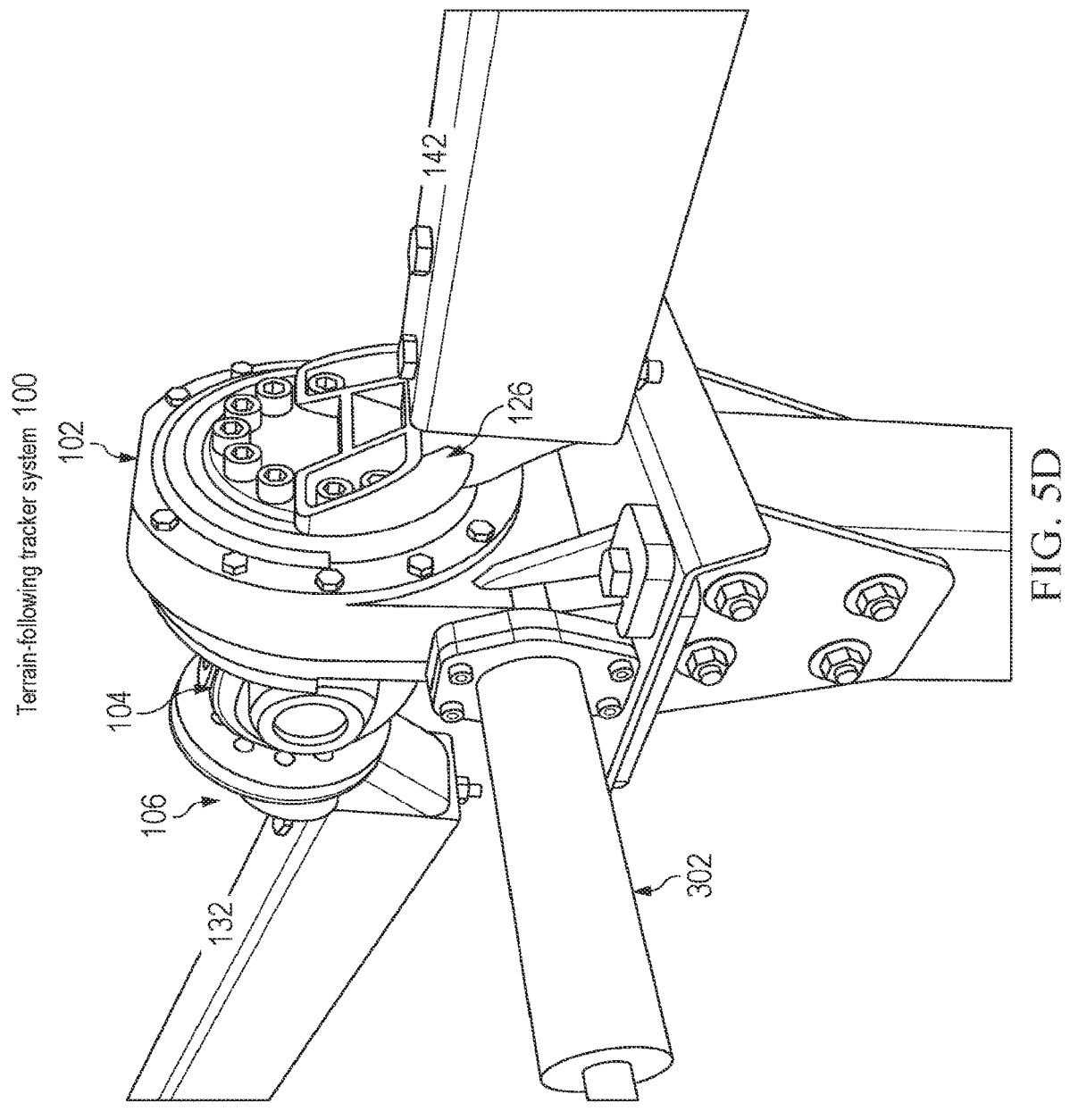
FIG. 5D illustrates a front right perspective view of a terrain-following tracker system according to some embodiments of the present invention.

FIG. 5D illustrates a front right perspective view of a terrain-following tracker system 100 according to some embodiments of the present invention.

Figure 5E:
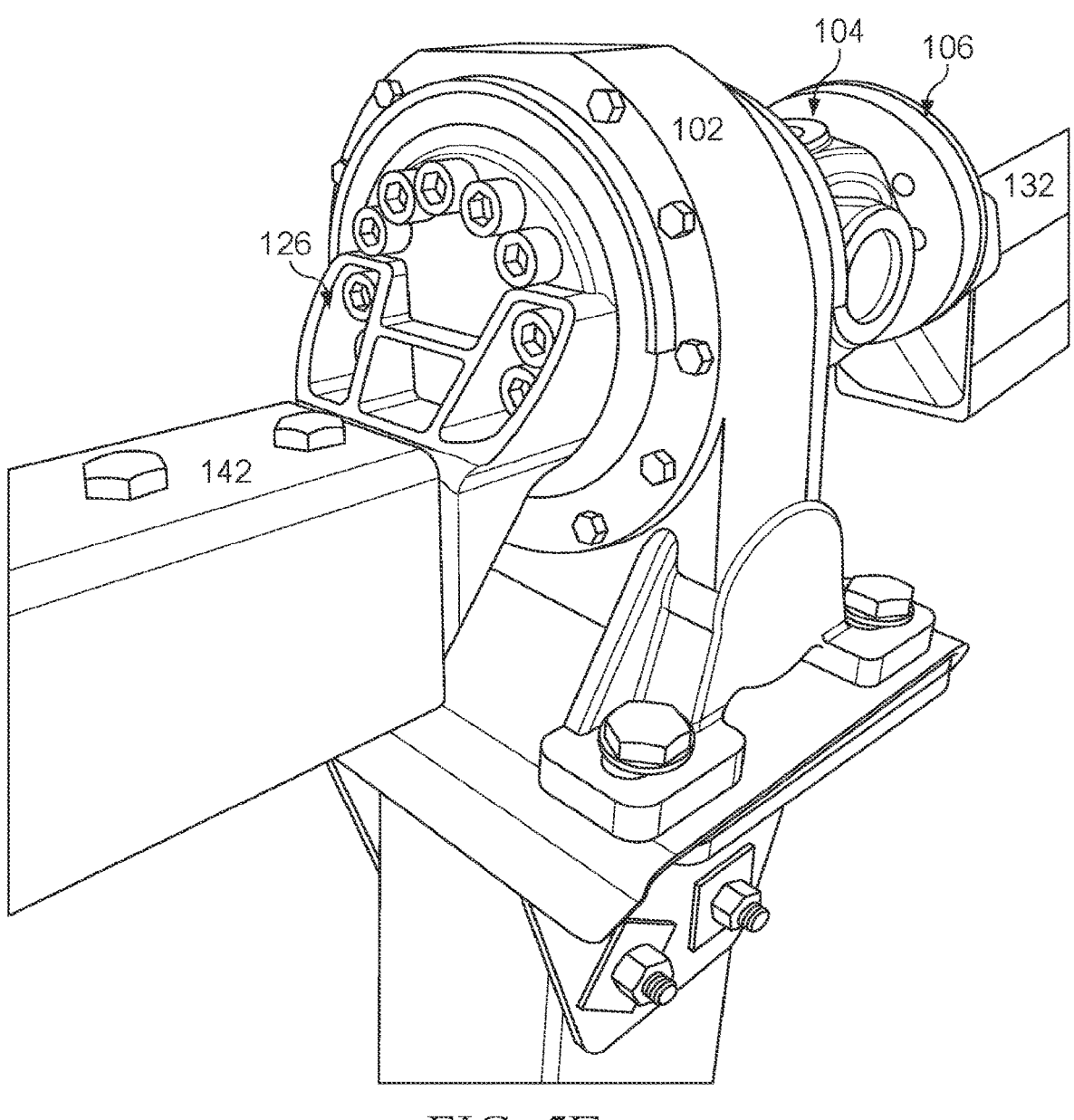
FIG. 5E illustrates a back left perspective view of a terrain-following tracker system according to some embodiments of the present invention.

FIG. 5E illustrates a back left perspective view of a terrain-following tracker system 100 according to some embodiments of the present invention.

As discussed below, in some embodiments, the terrain-following tracker system 100 may include articulating clamping systems (non-driven or idler-type) on posts. Example embodiments of clamping systems 600 are illustrated in FIGS. 6A-6G.

FIG. 6A illustrates an exploded front view of an example terrain-following clamping system 600 according to some embodiments of the present invention. The terrain-following clamping system 600 includes a first solar canopy 674, a second solar canopy 684, and an articulating clamping system 690 coupling the first solar canopy 674 to the second solar canopy 684.

The articulating clamping system 690 may securely attach first torque tube 656 and second torque tube 667 to each other and to the clamping post 640. The articulating clamping system 690 includes an articulating joint 602, an articulating joint connector 608 coupled to the articulating joint 602, an idle bearing 620 coupled to the articulating joint connector 608, post brackets 642 coupling the idle bearing 620 to the clamping or idle post (hereinafter "clamping post") 640, first output shaft 614 coupled to the articulating joint 602, and second output shaft 626 coupled to the idle bearing 620. In some embodiments, the post brackets 642 may be replaced with a pivotable post bracket system 116 to enable further terrain-following ability. The first output shaft 614 may be coupled to the first torque tube 656. The second output shaft 632 may be coupled to the second torque tube 667. Fasteners may be used to couple the first output shaft 614 to the first torque tube 656 in a same or similar manner as described for the first torque tube 132 and the first output shaft 106 in FIG. 2.

The articulating joint 602 may include a driving yoke 603, a driven yoke 604, and a spider 605. The driving yoke 603 may be attached to a driving yoke bracket 606 and the driven yoke 604 may be attached to a driven yoke bracket 607. The drive system 108 may cause one of the torque tube 656 or torque tube 667 to rotate. In the illustrated embodiment, rotation of the torque tube 667 causes rotation of the driving yoke 603 about one axis, which causes rotation of the driven yoke 604 about a different axis.

The articulating joint connector 608 may contain an interface fitting portion 609, output shaft connector bracket 610, and an articulating joint connector bracket 612. The driving yoke bracket 606 may be attached to an articulating joint connector bracket 612. The idle bearing 620 may have a hollow region to receive the articulating joint connector 608. In some embodiments, the idle bearing 620 may contain a sleeve 622 that fits around a periphery of the hollow region. The sleeve 622 may be a shell with an idle bearing opening 624. The idle bearing opening 624 may be configured to fit the interface fitting portion 609 of the articulating joint connector 608.

In some embodiments, the post brackets 642 may contact and be coplanar with side surfaces of the clamping post 640. The post brackets 642 may have post bracket slots 644. A fastener may be affixed into each of the post bracket slots 644 and into a side surface of the clamping post 640. The fastener secures the post brackets 642 to the clamping post 640.

The driven yoke bracket 607 may be attached to a first output shaft 614 via a first output shaft bracket 615. The first output shaft bracket 615 may include a first torque tube interface 616. A first torque tube 656 may attach to the first torque tube interface 616, for example, by fitting onto the first torque tube interface 616. One or more mating fasteners through the first torque tube 656 and the first torque tube interface 616 may securely attach the first torque tube 656 with the first torque tube interface 616. Attachment of the first output shaft 614 to the driven yoke bracket 607 may be in a same or similar manner as described in FIG. 3 for the driven yoke bracket 240 and the first output shaft 106. A first support structure component 652 may be attached, via first torque tube clamps 654, to the first torque tube 656.

Second output shaft bracket 626 of the second output shaft 632 may be attached to the output shaft connector bracket 610. The second output shaft 632 may include a second torque tube interface 630. A second torque tube 667 may attach to the second torque tube interface 630, for example, by sliding onto the second torque tube interface

630. The second torque tube 667 may be fastened to the second torque tube interface 630 via fasteners affixed to both the second torque tube interface 630 and the second torque tube 667. A second support structure component 662 may be clamped, via second torque tube clamps 664, to the second torque tube 667. The first and second torque tube clamps 654, 664, and other torque tube clamps may constitute a torque tube clamping assembly. Together, the first and second support structure components 652, 662, and other support structure components may constitute support structure.

In some embodiments, the first output shaft 614 drops the position of the attached solar canopy, bringing the center of mass of the attached solar canopy 674 closer to the axis about which it tilts. Similarly, the second output shaft 626 drops the position of the attached solar canopy 684, bringing the center of mass of the attached solar canopy closer to the axis about which it tilts.

FIG. 6B illustrates an exploded back view of an example terrain-following clamping system 600 according to some embodiments of the present invention.

FIG. 6C illustrates a back view of an example terrain-following clamping system 600 according to some embodiments of the present invention.

FIG. 6D illustrates a front view of an example terrain-following clamping system 600 according to some embodiments of the present invention.

FIG. 6E illustrates a front perspective view of an example terrain-following clamping system 600 according to some embodiments of the present invention.

FIG. 6F illustrates a back view of an example terrain-following clamping system 600 with solar panels according to some embodiments of the present invention. As shown, the terrain-following clamping system 600 includes first and second solar panel decks 672 and 682.

FIG. 6G illustrates a front perspective view of the terrain-following clamping system 600, further including first and second solar panel decks 672 and 682 installed onto the support structure components 652, 662. In some embodiments, the first solar canopy 674 includes the first solar panel deck 672, the first support structure component 652, and the first torque tube 656. In some embodiments, the second solar canopy 684 includes the second solar panel deck 682, the second support structure component 662, and the second torque tube 667.

In some embodiments, the terrain-following tracker system may include articulating joints offset from clamping posts or offset from (e.g., positioned between) solar decks. Example implementations of these embodiments are illustrated in FIGS. 7A and 7B.

FIG. 7A illustrates a front perspective view of an example articulating clamping system in which an articulating joint 702 is offset from the clamping post 740 according to some embodiments of the present invention. As shown, the clamping system 700 may include a non-articulating clamping system 790 separate from an articulating joint 702. The non-articulating clamping system 790 may securely attach a first torque tube 756 to the clamping post 740. When implemented in conjunction with the offset articulating joint 702, the non-articulating clamping system 790 becomes an articulating clamping system.

The non-articulating clamping system 790 may include a torque tube housing assembly 780 having a torque tube opening, a semicircular bearing slot 782, a fixed bearing assembly 776 with fixed bearings 778, and one or more post brackets 772. Tilting of the first torque tube 756 in the torque tube opening causes the fixed bearings 778 to move within the bearing slot 782.

In some embodiments, the fixed bearing assembly 776 may be secured to the clamping post 740 via one or more post brackets 772. In some embodiments, surfaces of the post brackets 772 contact the side surfaces of the clamping post 740. The post brackets 772 may have post bracket slots 774. Within each of the post bracket slots 774, a fastener may be inserted and secured to attach the post brackets 772 to the clamping post 740.

The articulating joint 702 may include a driving yoke 703, a driven yoke 704, and a spider (not shown). The articulating joint 702 may directly couple the first torque tube 756 and a second torque tube 766. In some embodiments, the driving yoke 703 may be attached to a driving yoke bracket 706 and the driven yoke 704 may be attached to a driven yoke bracket 707. The driven yoke bracket 707 may be attached to a first torque tube bracket 708 of the torque tube 756. The driving yoke bracket 708 may be attached to a second torque tube bracket 709 of the torque tube 766. Offset from the articulating joint 702, a first torque tube clamp 754 may clamp the first torque tube 756 to a first support structure component 752. Also offset from the articulating joint 702, a second torque tube clamp 764 may clamp the second torque tube 766 to a second support structure component 762.

The first torque tube 756 may be clamped, via first torque tube clamps 754, to a first support structure component 752. The second torque tube 766 may be clamped, via second torque tube clamps 764, to a second support structure component 762.

Thus, when the drive system 108 rotates one of the torque tubes adjacent to it, the driving yoke 703 will receive and transfer the rotational force to the driven yoke 704, which in turn will cause the adjacent torque tube to rotate. Notably, because of the articulating joint 702, the axes need not be colinear.

In some embodiments, instead of post brackets 772, the articulating clamping system 790 may be affixed to the clamping post 740 via a pivotable post bracket system 116, to enable additional terrain-following ability.

FIG. 7B illustrates a front perspective view of an example articulating clamping system 700 in which an articulating joint 702 is offset from the clamping post 740 according to some embodiments of the present invention. As shown, the terrain-following clamping system 700 includes first and second solar panel decks 776 and 786 installed onto the first and second support structure components 752 and 762. In some embodiments, first solar canopy 778 includes the first solar decks 776, the first support structure component 752, and the first torque tube 756. In some embodiments, second solar canopy 788 includes the second solar decks 786, the second support structure component 762, and the second torque tube 766.

FIG. 8A is a diagram illustrating a terrain-following tracker system 100 including a drive system 108 and clamping systems, according to some embodiments of the present invention. As shown, the terrain-following tracker system 100 includes a combination of the drive system 108 and one or more clamping systems, which may each be an instance of the non-articulating clamping system 790. The non-articulating clamping systems 790 may be attached to clamping posts 740. As described above, rotation of the drive system 108 causes tilt of the solar canopies 138 and 148 about first and second axes, respectively. Tilting of the solar canopies 138 and 148 further causes tilt of other solar canopies attached to the non-articulating clamping systems 790, such as solar canopies 667.

FIG. 8B illustrates a front perspective view of a terrain-following tracker system 100 including a drive system 108 coupled to a drive post 114, non-articulating clamping systems 790 coupled to clamping posts 740, and untilted solar canopies 138 and 148, according to some embodiments of the present invention.

FIG. 8C illustrates a front perspective view of a terrain-following tracker system 100 including a drive system 108 coupled to a drive post 114, non-articulating clamping systems 790 coupled to clamping posts 740, and tilted solar canopies 138 and 148, according to some embodiments of the present invention.

FIG. 9 is a diagram illustrating a front perspective view of a terrain-following tracker system 100 including a drive system 108 coupled to a drive post 114, articulating clamping systems 690 each attached to a clamping post 640, a non-articulating clamping system 790 coupled to a clamping post 740, and tilted solar canopies 138, 148, 674 and 684, according to some embodiments of the present invention. As shown, the terrain-following tracker system 100 includes a combination of the drive system 108, with articulating clamping systems 690 and a non-articulating clamping system 790. The drive post 114 may be positioned at one end of the solar canopy 148. Rotation of the drive system 108 may cause the solar canopy 138 to tilt about a first axis and the solar canopy 148 to tilt about a second axis. At the opposite end of the solar canopy 148, the non-articulating clamping system 790 may be attached to the clamping post 740 without an articulating joint.

As shown, the solar canopy 138 is adjacent to the solar canopy 674. The articulating clamping system 690 may be attached between the solar canopies 138 and 674. In other embodiments, instead of the articulating clamping system 690, a combination of the non-articulating clamping system 790 and the articulating joint 702 may be used. The articulating clamping system 690 may cause the solar canopy 674 to tilt about a third axis which may be different from the first axis or the second axis.

As shown, the solar canopy 674 is adjacent to the solar canopy 684. The articulating clamping system 690 may be attached between the solar canopies 674 and 684. In other embodiments, instead of the articulating clamping system 690, a combination of the non-articulating clamping system 790 and the articulating joint 702 may be used. The articulating clamping system 690 may cause the solar canopy 684 to tilt about a fourth axis, which may be different from the first axis, the second axis, or the third axis.

The relevant principles shown in or discussed with regard to any of the figures may be applied to other figures. For example, any relevant principles shown in or discussed with regard to FIGS. 6A-6G may be applied to and/or be combined with relevant principles shown in or discussed with regard FIGS. 7A-7B, as appropriate.

Reference to A "and" B may be construed to also encompass the scenario of A "or" B. Reference to A "or" B may be construed to also encompass the scenario of A "and" B. The foregoing description of the preferred embodiments of the present invention is by way of example only, and other variations and modifications of the above-described embodiments and methods are possible in light of the foregoing teaching. The term substantially may be construed to mean within a range of, such as within 5 percent of, 10 percent of, 20 percent of, or any other suitable range. The embodiments described herein are not intended to be exhaustive or limiting.

The invention claimed is:

1. A drive system, comprising:
a ring gear configured to rotate about a first axis;
a first articulating joint including a driving yoke, a driven yoke and a spider coupling the driving yoke to the driven yoke, the driving yoke coupled to the ring gear and configured to rotate about the first axis, the driven yoke configured to rotate about a second axis;
a first output shaft coupled to the driven yoke and configured to be coupled to a first solar canopy, the first output shaft configured to induce tilt in the first solar canopy; and
a pivotable post bracket system coupled to the ring gear, the pivotable post bracket system configured to be coupled to a post and configured to pivot relative to the post,
wherein the ring gear includes first mating fasteners, and further comprising second mating fasteners coupling the first articulating joint to the first mating fasteners.

2. The drive system of claim 1, wherein the pivotable post bracket system comprises a pivoting post bracket and a drive bracket.

3. The drive system of claim 2, wherein the pivoting post bracket comprises fastener slots, each of the fastener slots configured to hold a fastener to affix the pivoting post bracket to a post and enable pivoting of the pivoting post bracket relative to the post.

4. The drive system of claim 3, wherein the fastener slots comprise arcuate slots.

5. The drive system of claim 3, wherein the fastener slots are symmetrically distributed.

6. The drive system of claim 1, wherein the first output shaft includes an articulating joint bracket, an offsetting link, and a torque tube interface, wherein the offsetting link enables a center of rotation of the first articulating joint to be offset from a center of mass of a first torque tube attached to the torque tube interface.

7. The drive system of claim 1, wherein the first articulating joint is coupled to a first side of the ring gear, and further comprising a second output shaft coupled to a second side of the ring gear and configured to be coupled to a second solar canopy.

8. The drive system of claim 7, further comprising a second articulating joint coupled between the second side of the ring gear and the second output shaft.

9. The drive system of claim 1, further comprising third and fourth mating fasteners coupling the first articulating joint to the first output shaft.

10. A terrain-following tracker system, comprising:
a first post;
a second post;
a first solar canopy between the first post and the second post;
a drive system coupled between the first post and the first solar canopy, the drive system comprising:

a ring gear configured to rotate about a first axis, the ring gear including first mating fasteners;
a first articulating joint including a driving yoke, a driven yoke and a spider coupling the driving yoke to the driven yoke, the driving yoke coupled to the ring gear and configured to rotate about the first axis, the driven yoke configured to rotate about a second axis;
a first output shaft coupled to the driven yoke and to the first solar canopy, the first output shaft configured to induce tilt in the first solar canopy;
a pivotable post bracket system coupled to the ring gear, the pivotable post bracket system coupled to the first post and configured to pivot relative to the first post; and
second mating fasteners coupling the first articulating joint to the first mating fasteners; and
a clamping system coupled between the second post and the first solar canopy and configured to tilt in response to the tilt of the first solar canopy.

11. The terrain-following tracker system of claim 10, wherein the clamping system includes a non-articulating clamping system.

12. The terrain-following tracker system of claim 10, wherein the clamping system includes an articulating clamping system.

13. The terrain-following tracker system of claim 12, wherein the articulating clamping system includes an articulating joint positioned offset from a non-articulating clamping system.

14. The terrain-following tracker system of claim 12, wherein the articulating clamping system includes a second articulating joint.

15. The terrain-following tracker system of claim 14, wherein the second articulating joint is positioned between the second post and the first solar canopy.

16. The terrain-following tracker system of claim 10, wherein the pivotable post bracket system comprises a pivoting post bracket and a drive bracket, and wherein the pivoting post bracket comprises fastener slots, each of the fastener slots configured to hold a fastener to affix the pivoting post bracket to the first post and enable pivoting of the pivoting post bracket relative to the first post.

17. The terrain-following tracker system of claim 16, wherein the fastener slots comprise arcuate slots.

18. The terrain-following tracker system of claim 10, wherein the first articulating joint is coupled to a first side of the ring gear, and further comprising a second output shaft coupled to a second side of the ring gear and configured to be coupled to a second solar canopy.

19. The terrain-following tracker system of claim 10, further comprising third and fourth mating fasteners coupling the first articulating joint to the first output shaft.

* * * * *